(12) United States Patent
Shimomoto

(10) Patent No.: US 10,430,135 B2
(45) Date of Patent: *Oct. 1, 2019

(54) RELAY APPARATUS, INFORMATION PROCESSING APPARATUS, INFORMATION PROCESSING SYSTEM, AND RECORDING MEDIUM STORING INFORMATION PROCESSING

(71) Applicant: RICOH COMPANY, LTD., Tokyo (JP)

(72) Inventor: Ryo Shimomoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 15/229,878

(22) Filed: Aug. 5, 2016

(65) Prior Publication Data

US 2016/0344816 A1    Nov. 24, 2016

Related U.S. Application Data

(63) Continuation of application No. 14/024,983, filed on Sep. 12, 2013, now Pat. No. 9,438,663.

(30) Foreign Application Priority Data

Sep. 18, 2012  (JP) .................. 2012-204878
Sep. 3, 2013   (JP) .................. 2013-182197

(51) Int. Cl.
  *G06F 3/12*   (2006.01)
  *H04L 29/08*  (2006.01)
  (Continued)

(52) U.S. Cl.
  CPC .......... *G06F 3/1265* (2013.01); *G06F 3/1204* (2013.01); *G06F 3/1236* (2013.01);
  (Continued)

(58) Field of Classification Search
  CPC ....... H04L 67/125; H04L 67/06; H04L 67/10; H04L 67/32; H04L 63/08; H04L 67/1095;
  (Continued)

(56) References Cited

U.S. PATENT DOCUMENTS 6,349,336 B1 *  2/2002  Sit .................... G06F 21/305
                                                    709/227
6,581,092 B1 *  6/2003  Motoyama .......... G06F 11/2294
                                                    709/206
(Continued)

FOREIGN PATENT DOCUMENTS

CN   101616234 A   12/2009
CN   102597945 A   7/2012
(Continued)

OTHER PUBLICATIONS

Japanese Office Action dated May 2, 2017 in Patent Application No. 2013-182197 (without English Translation).
(Continued)

*Primary Examiner* — Aaron N Strange
(74) *Attorney, Agent, or Firm* — Oblon, McClelland, Maier & Neustadt, L.L.P.

(57) ABSTRACT

A relay apparatus, which communicates with an operation device, operates in cooperation with a first server and a second server to send data identification information that identifies electronic data to be output from an output apparatus to the first server in response to a first request transmitted from the first server, and to send the electronic data obtained by the first server using the data identification information and output apparatus identification information that identifies the output apparatus to the second server in response to a second request transmitted from the second server to control output of the electronic data from the output apparatus.

11 Claims, 32 Drawing Sheets

(51) Int. Cl.
| | | |
|---|---|---|
| *H04N 1/00* | (2006.01) | |
| *H04N 1/32* | (2006.01) | |
| *H04N 1/327* | (2006.01) | |
| *H04L 29/06* | (2006.01) | |
| *H04W 88/04* | (2009.01) | |

(52) U.S. Cl.
CPC .......... *G06F 3/1268* (2013.01); *G06F 3/1288* (2013.01); *G06F 3/1292* (2013.01); *H04L 67/06* (2013.01); *H04L 67/125* (2013.01); *H04N 1/00233* (2013.01); *H04N 1/32122* (2013.01); *H04N 1/32771* (2013.01); *G06F 3/1238* (2013.01); *H04L 63/029* (2013.01); *H04N 2201/0094* (2013.01); *H04W 88/04* (2013.01)

(58) Field of Classification Search
CPC ........... H04N 1/32771; H04N 1/00222; H04N 1/00233; H04N 1/00238; G06F 3/1236; G06F 3/1292; G06F 9/466; G06F 9/4806; G06F 9/4843; G06F 9/4856; G06F 3/1204; G06F 3/1265; G06F 11/1461; G06F 3/1288; H04W 88/04
See application file for complete search history.

(56) References Cited

U.S. PATENT DOCUMENTS

| | | | | |
|---|---|---|---|---|
| 7,177,043 | B2* | 2/2007 | Qiao | H04L 63/02 358/1.13 |
| 8,006,296 | B2* | 8/2011 | Donatelli | H04L 29/06 726/11 |
| 8,346,903 | B2* | 1/2013 | Shepherd | G06F 3/1226 455/456.6 |
| 8,719,811 | B2* | 5/2014 | Vulugundam | H04N 1/00323 717/173 |
| 8,786,875 | B1* | 7/2014 | Khafizova | G06F 3/1204 358/1.15 |
| 9,507,789 | B2* | 11/2016 | Hashimoto | H04N 1/00957 |
| 2002/0174372 | A1* | 11/2002 | Venkataraman | H04L 67/1095 713/400 |
| 2003/0140095 | A1* | 7/2003 | Simpson | G06Q 30/02 709/203 |
| 2003/0149581 | A1* | 8/2003 | Chaudhri | G06Q 30/06 709/203 |
| 2004/0001226 | A1* | 1/2004 | Ohtuka | H04N 1/00209 358/1.15 |
| 2005/0071520 | A1* | 3/2005 | Hull | G06F 1/1632 710/8 |
| 2005/0108437 | A1 | 5/2005 | Loughney | |
| 2005/0223278 | A1* | 10/2005 | Saika | G06F 11/1461 714/15 |
| 2005/0277405 | A1* | 12/2005 | Noguchi | H04N 1/00127 455/411 |
| 2005/0280864 | A1* | 12/2005 | Lodwick | G06F 3/1203 358/1.15 |
| 2006/0050294 | A1* | 3/2006 | Smith | G06F 3/1204 358/1.15 |
| 2006/0059253 | A1 | 3/2006 | Goodman | |
| 2006/0149992 | A1* | 7/2006 | Shima | G06F 11/0733 714/4.1 |
| 2006/0277229 | A1 | 12/2006 | Yoshida et al. | |
| 2009/0150493 | A1* | 6/2009 | Tonegawa | H04L 51/30 709/206 |
| 2009/0323110 | A1 | 12/2009 | Shiimori et al. | |
| 2010/0085597 | A1* | 4/2010 | Vulugundam | H04N 1/00323 358/1.15 |
| 2010/0171973 | A1 | 7/2010 | Kimura | |
| 2010/0309510 | A1 | 12/2010 | Hansen | |
| 2011/0208864 | A1 | 8/2011 | St. Laurent | |
| 2011/0209211 | A1* | 8/2011 | Kuindersma | H04L 41/28 726/12 |
| 2011/0239123 | A1* | 9/2011 | Tsujimoto | H04L 63/08 715/740 |
| 2011/0242599 | A1 | 10/2011 | Ohara | |
| 2011/0304884 | A1 | 12/2011 | Kaneko | |
| 2012/0026539 | A1* | 2/2012 | Ohara | G06F 3/1204 358/1.15 |
| 2012/0081749 | A1 | 4/2012 | Kitada | |
| 2012/0218595 | A1* | 8/2012 | Miyazawa | G06F 3/126 358/1.15 |
| 2012/0287460 | A1* | 11/2012 | McMillin | H04N 1/00204 358/1.15 |
| 2013/0021638 | A1* | 1/2013 | Hong | G06F 3/1204 358/1.14 |
| 2013/0083337 | A1* | 4/2013 | Tecu | G06F 3/1204 358/1.13 |
| 2013/0088733 | A1* | 4/2013 | Yach | G06F 3/1219 358/1.13 |
| 2013/0212163 | A1 | 5/2013 | Shimomoto | |
| 2013/0141747 | A1* | 6/2013 | Oba | G06F 3/1292 358/1.14 |
| 2013/0246566 | A1* | 9/2013 | Asumi | H04L 67/32 709/217 |
| 2013/0268624 | A1* | 10/2013 | Yagiura | H04L 67/10 709/217 |
| 2014/0070002 | A1* | 3/2014 | Pineau | G06K 5/00 235/382 |
| 2014/0168685 | A1* | 6/2014 | St. Laurent | G06F 3/1204 358/1.14 |
| 2014/0237540 | A1* | 8/2014 | King | G06F 21/6218 726/1 |
| 2014/0240753 | A1* | 8/2014 | Anno | G06F 3/1236 358/1.15 |
| 2015/0062647 | A1 | 3/2015 | Miyazawa et al. | |
| 2015/0153980 | A1* | 6/2015 | Ito | G06F 3/1236 358/1.14 |
| 2015/0234621 | A1 | 8/2015 | Kimura | |
| 2015/0281403 | A1 | 10/2015 | Shedrinsky | |

FOREIGN PATENT DOCUMENTS

| | | |
|---|---|---|
| JP | 2004-046681 | 2/2004 |
| JP | 2007-011730 | 1/2007 |
| JP | 2011-95835 A | 5/2011 |
| JP | 2011-216938 A | 10/2011 |

OTHER PUBLICATIONS

Office Action dated Apr. 25, 2016 in Chinese Patent Application No. 201310441420.9.

* cited by examiner

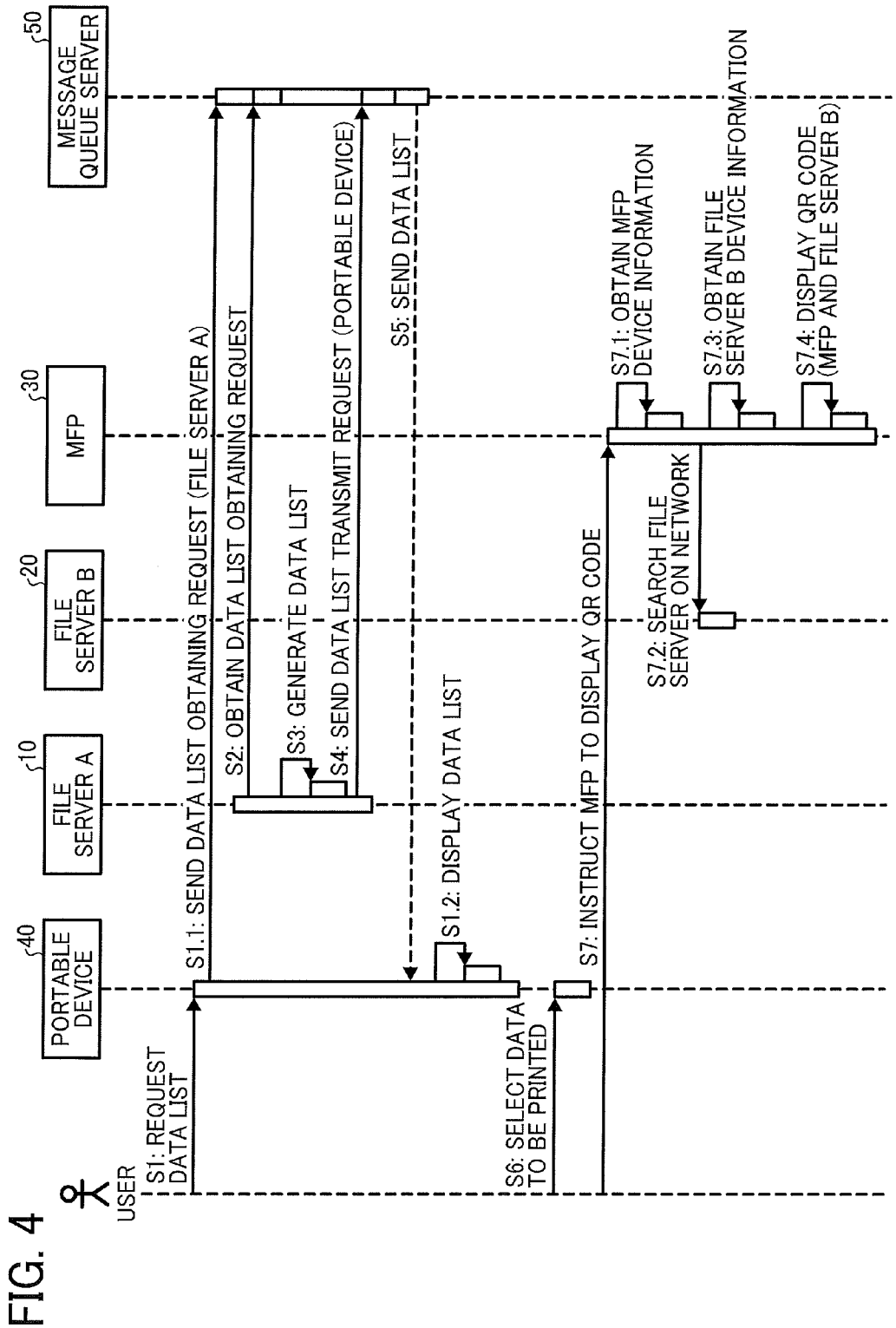

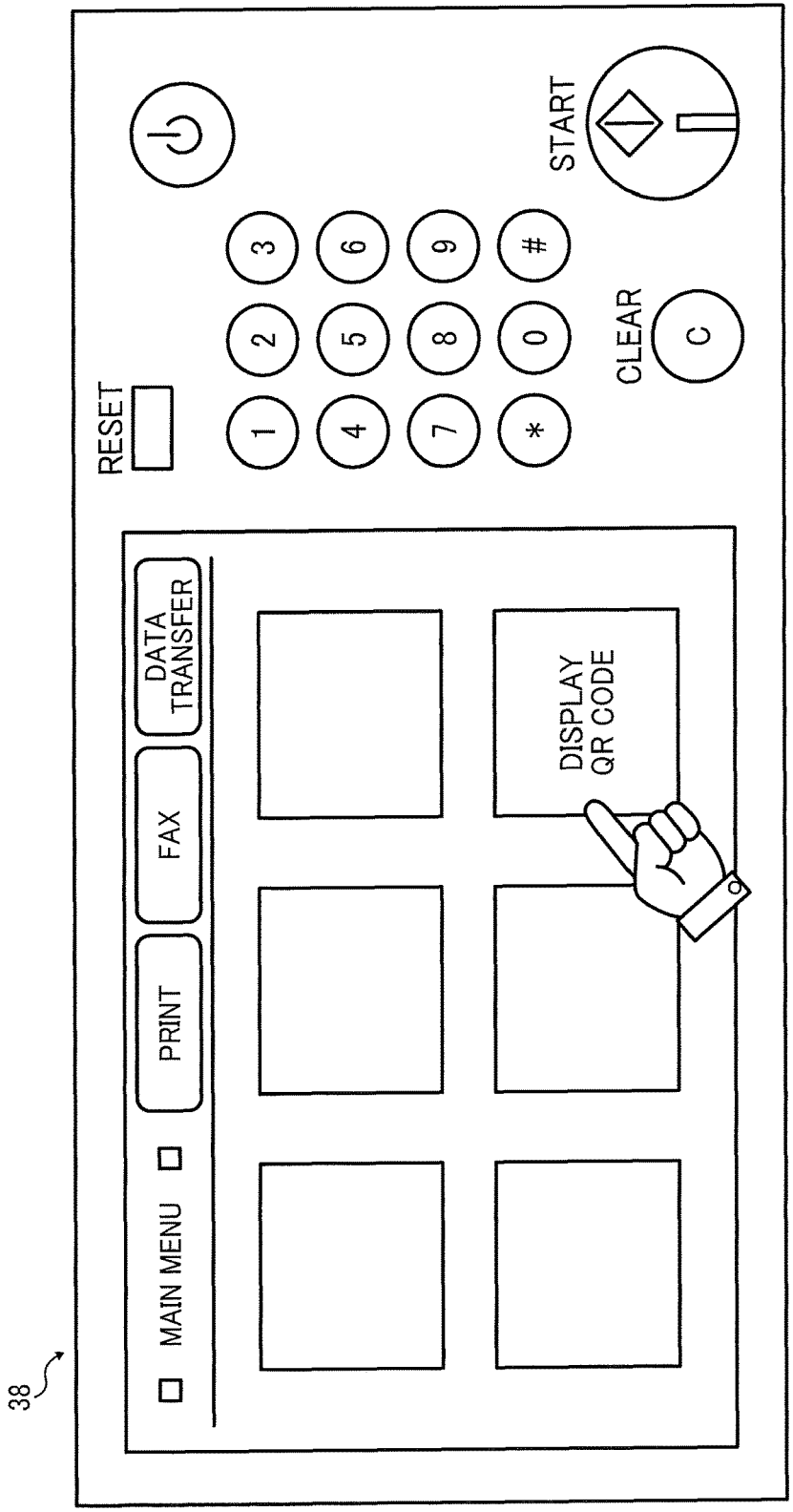

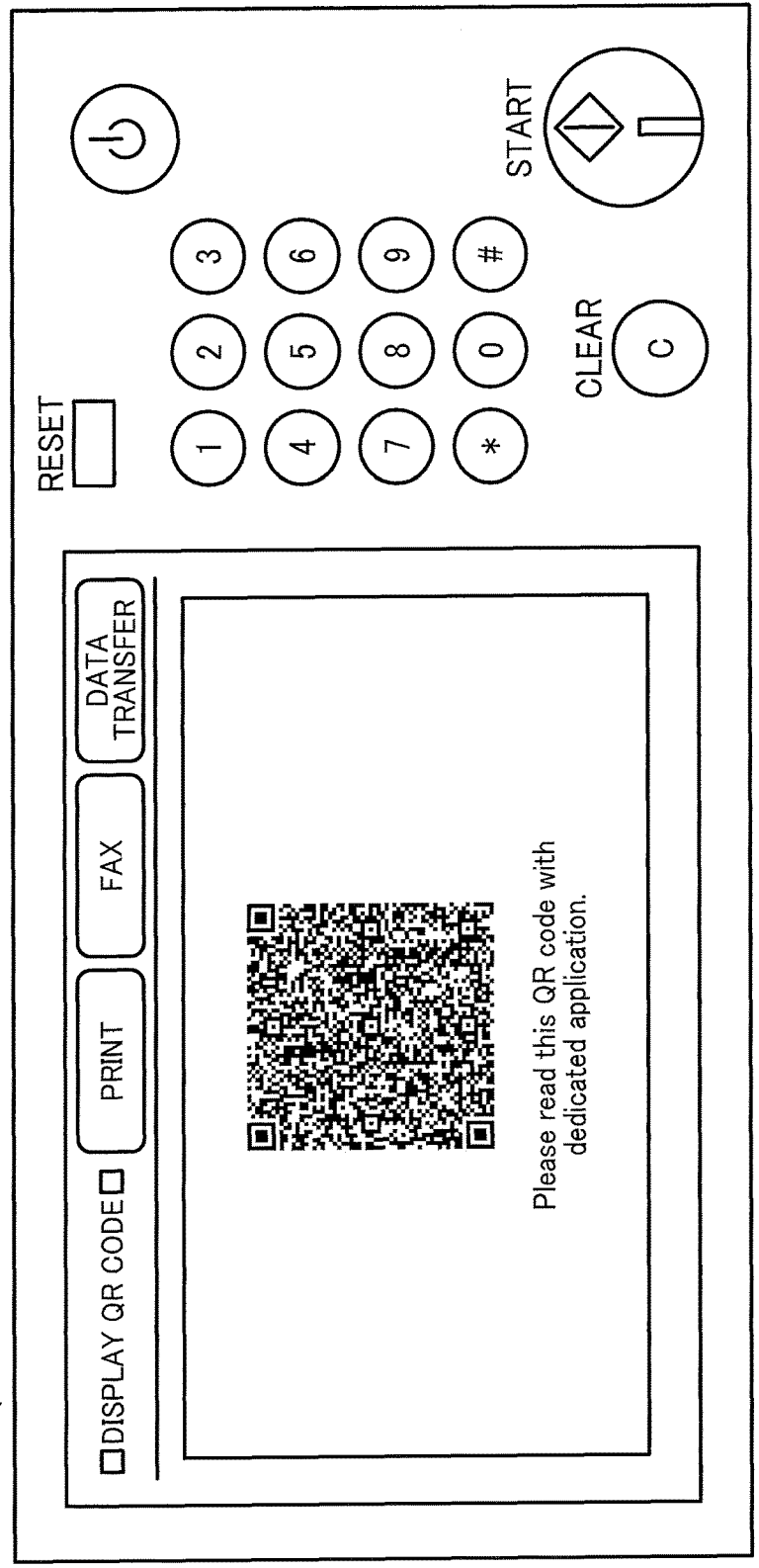

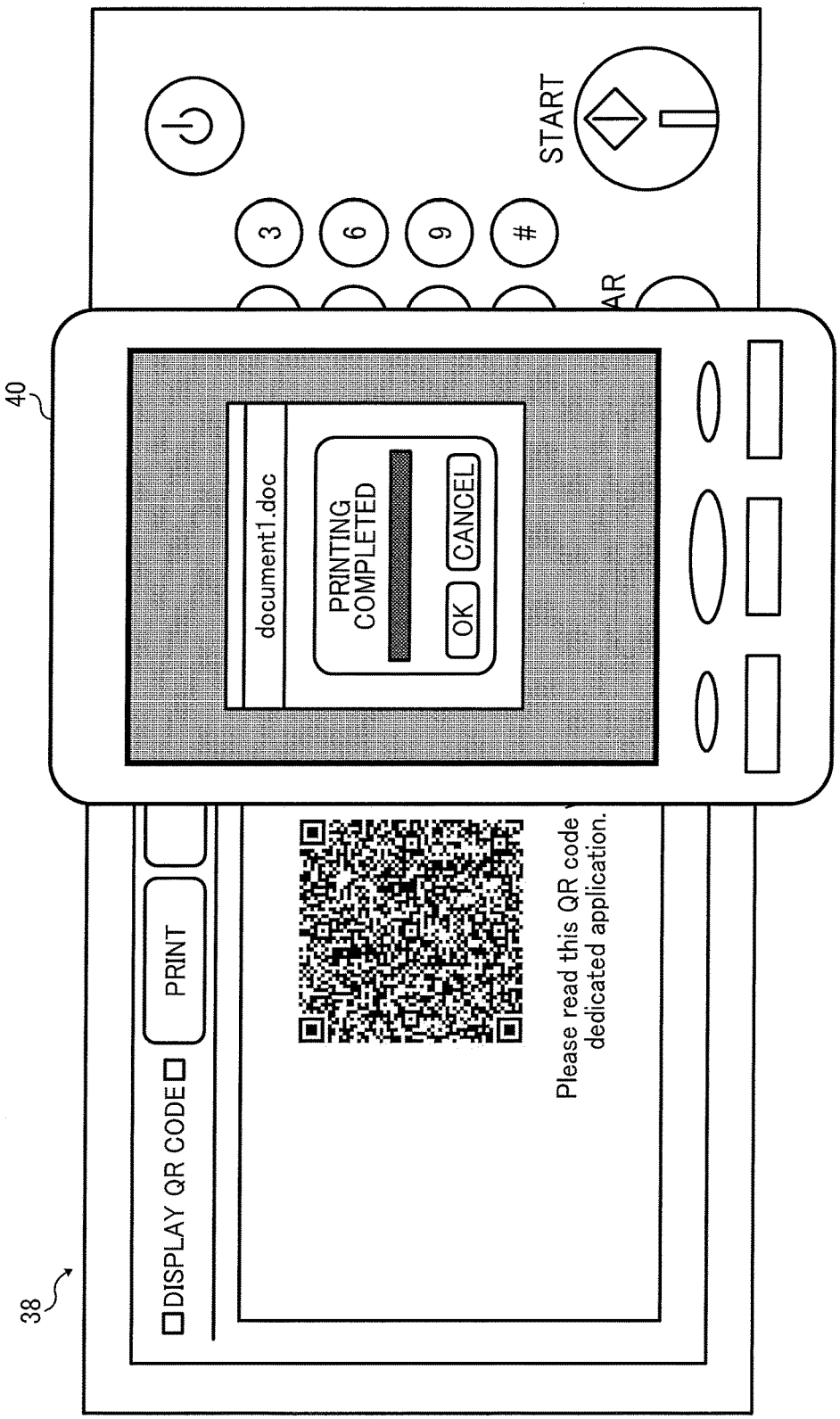

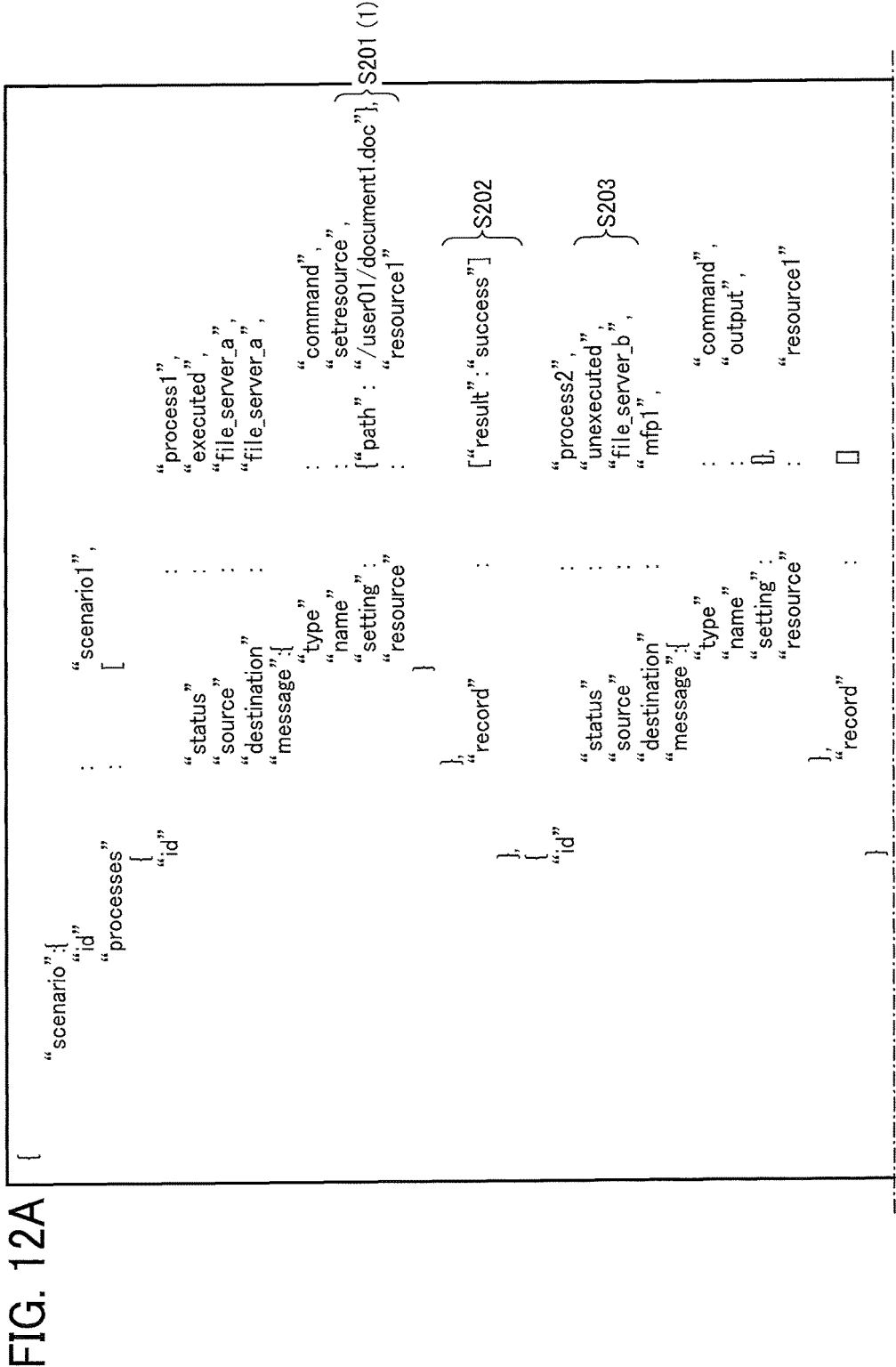

FIG. 12B

```
],
"device":[
    {
        "id"                : "file_server_a",
        "address"           : "192.168.0.2",
        "contactid"         : "file_server_a_id",
        "accessible_devices": []
    }
],
"resources":[
    {
        "id":"resource1",
        "type":"pdf"
    }
]
}
|=|=|resource_separator_start=|=|=|
|=|=|property_start=|=|=|
{
    "id":"resource1",
}
|=|=|property_end=|=|=|          ⎫
|=|=|data_start=|=|=|            ⎬ S201 (2)
BINARY DATA                      ⎪
|=|=|data_end=|=|=|              ⎭
|=|=|resource_separator_end=|=|=|
```

FIG. 14A

```
{
"scenario":{
  "id" : "scenario1",
  "processes" : [
    {
      "id" : "process1",
      "status" : "executed",
      "source" : "file_server_a",
      "destination" : "file_server_a",
      "message":{
        "type" : "command",
        "name" : "setresource",
        "setting" : {"path" : "/user01/document1.doc"},
        "resource" : "resource1"
      },
      "record" : ["result":"success"]
    },                                              ⎫
    {                                               ⎬ S301
      "id" : "process2",                            ⎭
      "status" : "executed",
      "source" : "file_server_b",
      "destination" : "mfp1",
      "message" :{
        "type" : "command",
        "name" : "output",
        "setting": {},
        "resource" : "resource1"
      },
      "record" : ["result":"success"]               ⎬ S303
    }
  ]
}
}
```

FIG. 14B

```
], "device" :[
  {
    "id"                : "file_server_a",
    "address"           : "192.168.0.2",
    "contactid"         : "file_server_a_id",
    "accessible_devices": []
  },
  {
    "id"                : "file_server_b",
    "address"           : "192.168.1.3",
    "contactid"         : "file_server_b_id",
    "accessible_devices": ["mfp1"]
  },
  {
    "id"                : "mfp1",
    "address"           : "192.168.1.4",
    "contactid"         : "mfp_contact_id",
    "accessible_devices": ["file_server_b"]
  }
], "resources" :[
]
```

```
{
  "scenario": {
    "id": "scenario1",
    "processes": [
      {
        "id": "process1",                           ⎫
        "status": "executed",                       ⎪
        "source": "file_server_a",                  ⎪
        "destination": "file_server_a",             ⎪
        "message": {                                ⎪
          "type": ,                                 ⎪
          "name": "command",                        ⎬ S401
          "setting": "setresource",                 ⎪
          "resource": {"path": "/user01/document1.doc"},  ⎪
        },                                          ⎪
        "record": □                                 ⎭
      },
      {
        "id": "process2",
        "status": "unexecuted",
        "source": "file_server_b",
        "destination": "mfp1",
        "message": {
          "type": ,
          "name": "command",
          "setting": "output",
          "resource": "resource1"
        },
        "record": {}
        □
      }
    ]
  }
}
```

FIG. 20A

```
{
  "scenario" : {
    "id" : "scenario1",
    "processes" : [
      {
        "id" : "process1",
        "status" : "unexecuted",
        "source" : "file_server_b",
        "destination" : "mfp1",
        "message" : [
          {
            "type" : "command",
            "name" : "output",
            "setting" : [{"path" : "/user01/document2.doc"}],  }S503
            "resource" : "resource1"
          :
          □
        ]
      },
      "record" :
      :
    ]
  }
}
```
⎫
⎬ S502
⎭

FIG. 20B

```
    ],
    "device":[
    {
        "id"                : "file_server_b",
        "address"           : "192.168.1.3",
        "contactid"         : "file_server_b_id",
        "type"              : "file_server",
        "accessible_devices": ["mfp1"]
    },
    {
        "id"                : "mfp1",
        "address"           : "192.168.1.4",
        "contactid"         : "mfp_contact_id",
        "type"              : "mfp",
        "accessible_devices": ["file_server_b"]
    }                                              } S501
    ],
    "resources":[
    {
        "id" : "resource1"
    }
```

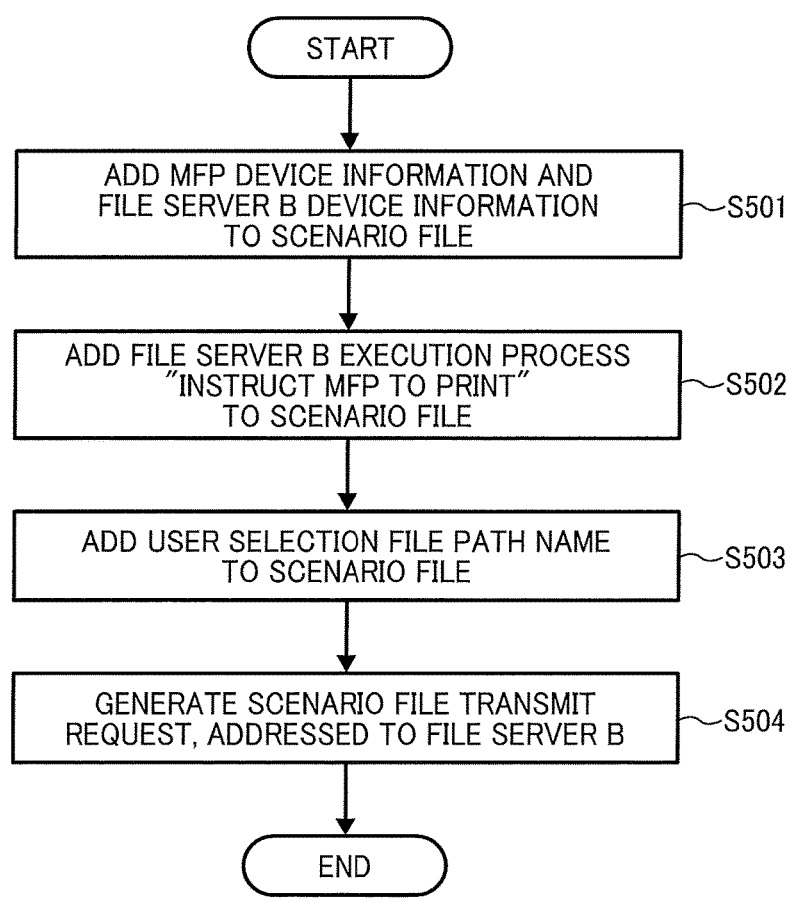

FIG. 22A

```
{
 "scenario":[
  {
   "id": "scenario1",
   "processes":[
    {
     "id" :  "process1",
     "status" : "executed",
     "source" : "file_server_b",
     "destination" : "mfp1",
     "message":{
      "type" : "command",
      "name" : "output",
      "setting" : [{"path" : "/user01/document2.doc"},
      "resource" : "resource1"
     }
    },                                                 }S601
    "record" : ["result" : "success"]                  }S602
   }
  ]
 }
```

FIG. 22B

```
], "device":[
    {
        "id"                : "file_server_b",
        "address"           : "192.168.1.3",
        "contactid"         : "file_server_b_id",
        "accessible_devices": ["mfp1"]
    },{
        "id"                : "mfp1",
        "address"           : "192.168.1.4",
        "contactid"         : "mfp_contact_id",
        "accessible_devices": ["file_server_b"]
    }
],
"resources":[
]
```

RELAY APPARATUS, INFORMATION PROCESSING APPARATUS, INFORMATION PROCESSING SYSTEM, AND RECORDING MEDIUM STORING INFORMATION PROCESSING

CROSS-REFERENCE TO RELATED APPLICATIONS

This application is a continuation of and claims the benefit of priority under 35 U.S.C. § 120 to U.S. application Ser. No. 14/024,983, filed Sep. 12, 2013, which is based on and claims the benefit of priority under 35 U.S.C. § 119 to Japanese Patent Application Nos. 2012-204878, filed on Sep. 18, 2012, and 2013-182197, filed on Sep. 3, 2013, in the Japan Patent Office, the entire contents of all of which are hereby incorporated by reference herein.

BACKGROUND

Technical Field

The present invention generally relates to a relay apparatus, an information processing apparatus, information processing system, and information processing program stored in a non-transitory recording medium.

Description of the Related Art

In the office environments, a file server such as a network attached storage (NAS) is usually provided on a local network to allow sharing of electronic files among users. With the wide-spread use of portable phone such as smart phone, it is desired to access the file server on the local network using the portable phone through a 3G network to obtain the electronic file on the local network. In most cases, however, a firewall is provided on the local network to prohibit the access to the local network from the outside, thus making difficult for the user to access the local network using the portable phone.

SUMMARY

A relay apparatus, which communicates with an operation device, operates in cooperation with a first server and a second server to send data identification information that identifies electronic data to be output from an output apparatus to the first server in response to a first request transmitted from the first server, and to send the electronic data obtained by the first server using the data identification information and output apparatus identification information that identifies the output apparatus to the second server in response to a second request transmitted from the second server to control output of the electronic data from the output apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a data sequence diagram illustrating operation of processing a request for outputting data stored in a file server, performed by the information processing system of FIG. 3, according to an example embodiment of the present invention;

FIG. 7A is an illustration of an example screen displayed on a touch panel of an image forming apparatus of the information processing system of FIG. 2;

FIG. 7B is an illustration of an example screen displayed on the touch panel of the image forming apparatus of the information processing system of FIG. 2;

FIG. 9B is an illustration of an example screen displayed on the portable device of FIG. 2;

FIGS. 12A and 12B are an illustration of an example data structure of a scenario file, updated by the file server of the information processing system of FIG. 2;

FIGS. 14A and 14B are an illustration of an example data structure of a scenario file, updated by the file server of the information processing system of FIG. 2;

FIGS. 17A and 17B are an illustration of an example data structure of a scenario file, updated by the file server of the information processing system of FIG. 2;

FIGS. 20A and 20B are an illustration of an example data structure of a scenario file, generated by the portable device of FIG. 2;

FIG. 21 is a flowchart illustrating operation of generating a scenario file, performed by the portable device of FIG. 2, according to an example embodiment of the present invention;

FIGS. 22A and 22B are an illustration of an example data structure of a scenario file, updated by the file server of the information processing system of FIG. 2;

Figure 1:
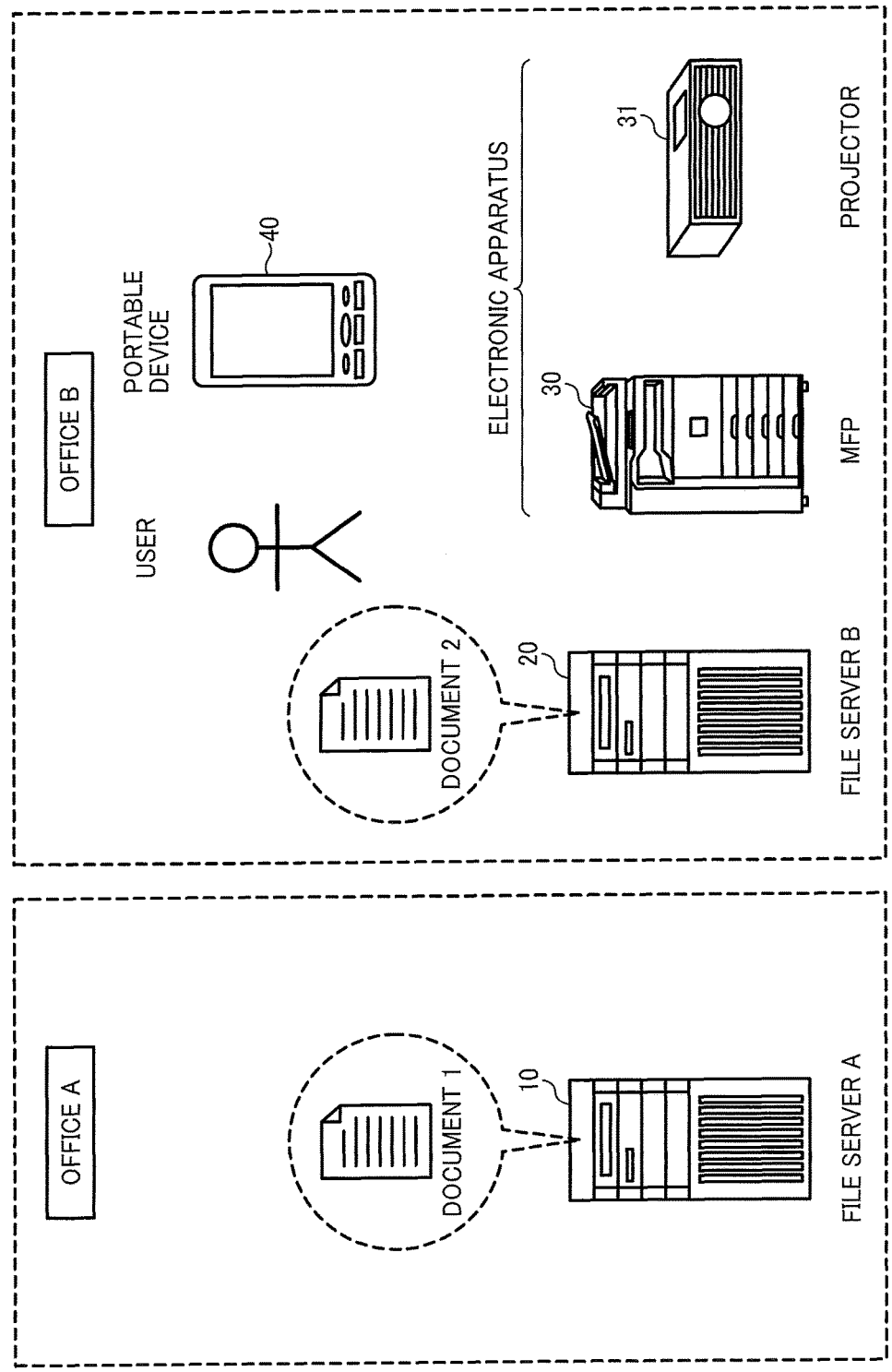
FIG. 1 is an illustration for explaining an environment in which data stored in a file server is output according to an instruction input through a portable device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As illustrated in FIG. 1, in this example, a file server 10 ("file server A") is located in an office A, and a file server 20 ("file server B") is located in an office B. In addition to the file server, one or more electronic apparatuses may be provided at any one of the offices A and B. For example, in the office B, a multifunctional printer (MFP) 30 and a projector 31 are provided, each of which is capable of communicating with the file server B. In alternative to the MFP 30 and the projector 31, any desired output apparatus capable of communicating with the file server B may be provided. For example, any desired image forming apparatus other than the MFP 30 may be provided. Any desired image projection apparatus other than the projector 31 may be provided.

Further, in this example, it is assumed that a user, who is present in the office B, instructs a portable device 40 to print data, which is stored in any one of the file server A or the file server B, using the MFP 30. Examples of the portable device 40 include, but not limited to, a smart phone, a tablet personal computer (PC), and a personal digital assistant (PDA).

Referring now to FIGS. 1 to 17, operation of printing data stored in the file server A is explained according to an example embodiment of the present invention. In this example, the user in the office B operates the portable device 40 to instruct to print an electronic data file "document1", stored in the file server A in the office A. In such case, the electronic data file "document1" is copied onto the file server B. The MFP 30 obtains the electronic data file "document 1" from the file server B to output a printed image based on the file "document1".

Figure 2:
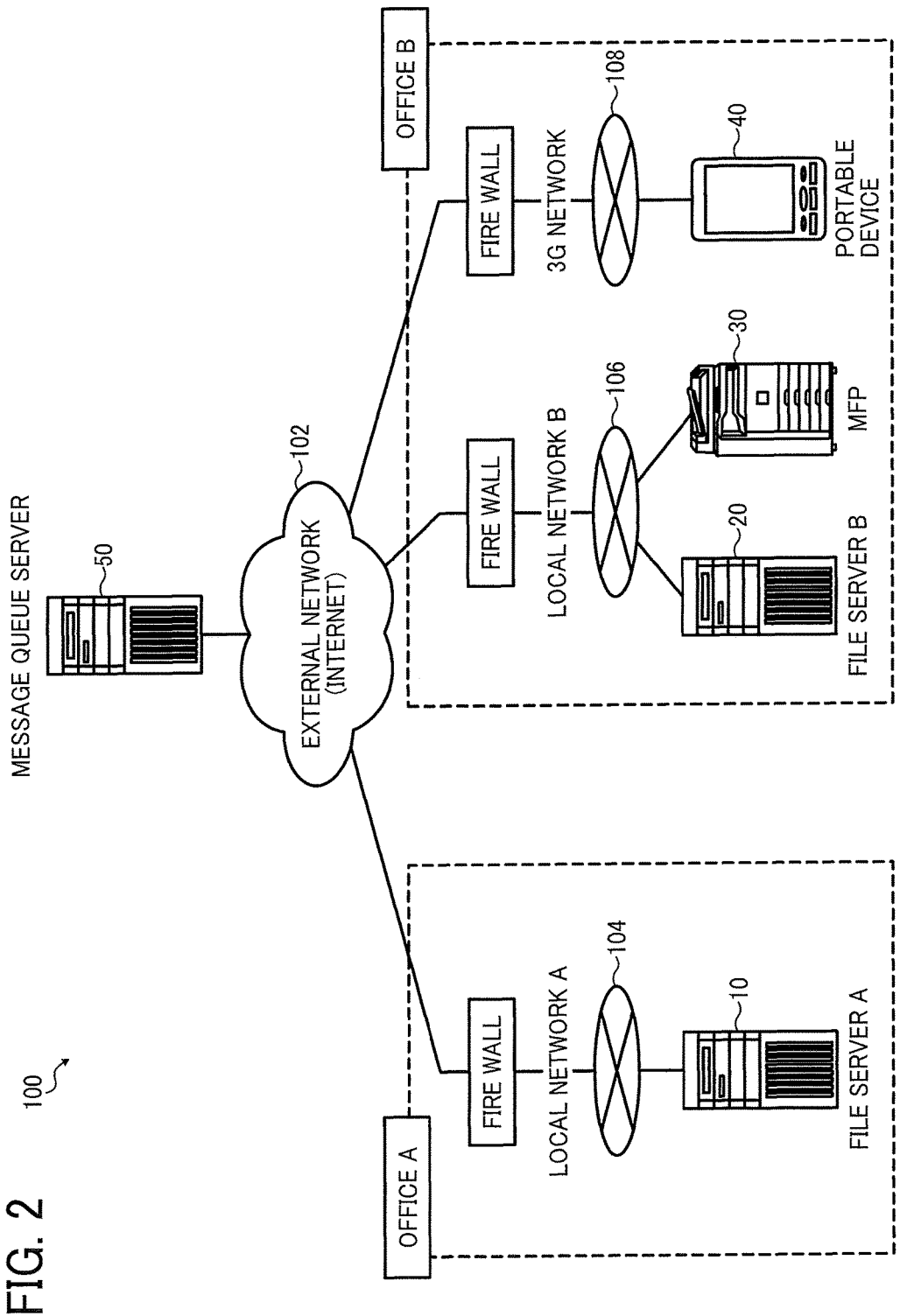
FIG. 2 is an illustration of a network configuration of an information processing system, according to an example embodiment of the present invention.

FIG. 2 illustrates a network configuration of a file server system 100 according to an example embodiment of the present invention. The file server system 100 includes the file server A (file server 10), the file server B (file server 20), the MFP 30 as one example of electronic apparatus, the portable device 40, and a message queue server 50. While the projector 31 may be provided in the office B, it is omitted for the descriptive purposes.

The message queue server 50 is provided on an external network 102 such as the Internet. The file server A is provided on a local network 104, which may be referred to as the local network A. The file server B and the MFP 30 are provided on a local network 106, which may be referred to as the local network B. The portable device 40 is connected to a 3G network 108.

In this example, the external network 102 may be alternatively referred to as a global network or a public network, which may be any network without firewall protection that can be directly connected to the Internet. The local network A or B may be alternatively referred to as a private network, which may be any network with firewall protection. In alternative to the 3G network, the portable device 40 may be connected to any desired network, such as any other telecommunication network.

More specifically, firewalls are provided, respectively, between the external network 102 and the local network A, between the external network 102 and the local network B, and between the external network 102 and the 3G network 108, to assure the security within each network. With the firewall, access to the external network 102 from the file server A, the file server B, or the portable device 40 (collectively referred to as a local device) is allowed, but access to the local device from the external network 102 is basically prohibited. Accordingly, a HTTP request from the local device to the local device of the other network is blocked at the firewall, such that the local device at one site is not able to directly access the other local device at the other site. In order to allow communication between or among the local devices at different sites, the message queue server 50 is provided on the file server system 100. As described below, with the message queue server 50, the file server system 100 relays communication of data between or among the local devices respectively provided on different networks.

Figure 3:
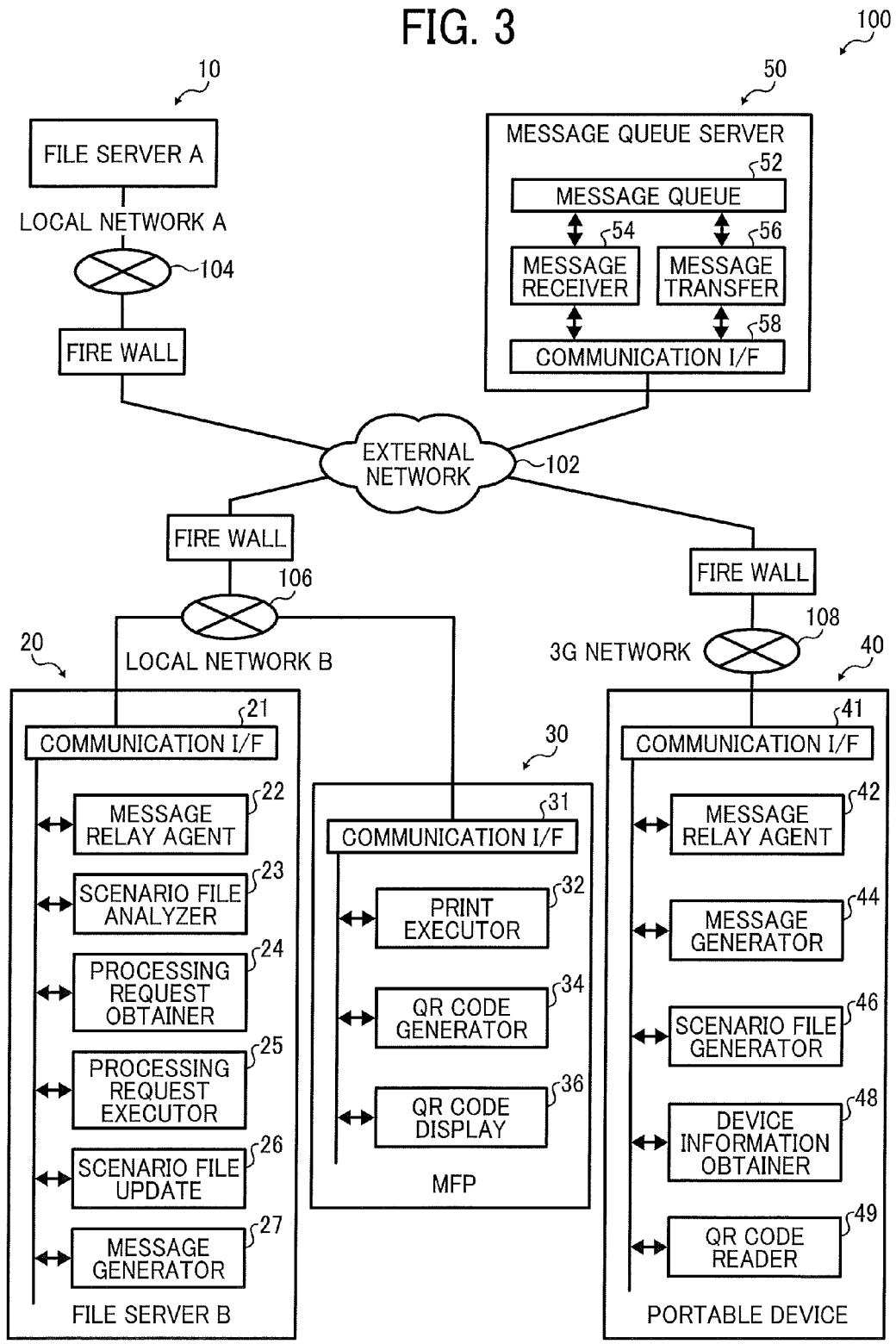
FIG. 3 is a schematic block diagram illustrating a functional structure of the information processing system of FIG. 2.

FIG. 3 illustrates a functional structure of the file server system 100 of FIG. 2. Since the file server A is substantially similar in function and operation to the file server B, the file server A is omitted in FIG. 3. For the purposes of describing the functional modules, the file server A and the file server B may be each or collectively to as the file server.

The file server and the portable device 40 are respectively provided with a message relay agent 22 and a message relay agent 42. The message relay agent controls transmission or reception of a message between the file server or the portable device 40, and the message queue server 50, via a communication interface (I/F) 21 or a communication I/F 41.

The message queue server 50 is a web server, which communicates with the message relay agent 22 or 42 that functions as a client, based on HTTP. The message queue server 50 functions as a relay device, which transfers a message transmitted from the other network to a destination. The message queue server 50 includes a message queue 52, a message receiver 54, a message transfer device (message transfer) 56, and a communication interface (I/F) 58. The message receiver 54 receives a message addressed to a specific destination, which is transmitted from the message relay agent 22 or 42, via the communication I/F 58. The message queue 52 stores the received message in a queue, by each specified address. For example, the message queue 52 stores the message in association with information indicating the specific address. In this example, it is assumed that the specific address indicates a destination local device, such as the file server A, the file server B, or the portable device 40.

The message relay agent 22 or 42 periodically sends a message obtaining request to the message queue server 50. Alternatively, the message relay agent 22 or 42 may send a message obtaining request to the message queue server 50 at any desired time. The message transfer 56 of the message queue server 50 specifies a sender of the message obtaining request, and obtains the message addressed to the destination, that is, the sender of the message obtaining request. The message transfer 56 transfers the obtained message to the message relay agent of the sender, which is the destination local device.

The MFP 30 includes a print executor 32, a QR code generator 34, a QR code display 36, and a communication I/F 31. The print executor 32, which may be a functional module that executes print processing, outputs a printed image based on an electronic file transmitted from the outside. The QR code generator 34 generates a QR code, which is embedded with device information of the MFP 30, in response to a user request. The QR code display 36 displays the QR code generated at the QR code generator 34 on a touch panel screen of an operation panel of the MFP 30.

In one example, the QR code generator 34 searches a local network on which the MFP 30 resides, for a file server communicable with the MFP 30. The QR code generator 34 embeds device information of the searched file server (in this example, the file server B), and the device information of the MFP 30, into the QR code. The QR code display 36 displays the QR code, generated by the QR code generator 34, onto the touch panel screen.

In addition to the functional modules illustrated in FIG. 3, the MFP 30 may be provided with the other functional modules, for example, the functional modules related to image processing.

In addition to the message relay agent 42 and the communication I/F 41, the portable device 40 includes a message generator 44, a scenario file generator 46, a device information obtainer 48, and a QR code reader 49.

The QR code reader 49 may be implemented by a digital camera, which is installed on the portable device 40. In this example, the user uses the QR code reader 49 to capture an image of the QR code, displayed on the operation panel of the MFP 30. The device information obtainer 48 analyzes the QR code, which is captured by the QR code reader 49, to obtain device information embedded in the QR code.

The scenario file generator 46 generates a scenario file, which describes a plurality of processing requests to be performed by different entities (devices) as well as the order of executing the plurality of processing requests. The scenario file generator 46 uses the device information obtained at the device information obtainer 48 to generate the scenario file.

The message generator 44 generates a message including the scenario file generated at the scenario file generator 46. The message generator 44 identifies the file server, which is described by the scenario file, as the first entity that performs the first processing request of the plurality of processing requests, and generates the message addressed to the identified file server.

In addition to the message relay agent 22 and the communication I/F 21, the file server includes a scenario file analyzer 23, a processing request obtainer 24, a processing request executor 25, a scenario file update 26, and a message generator 27.

The scenario file analyzer 23 analyzes the scenario described in the scenario file, which is included in the message received from the message queue server 50, to extract the processing request to be performed by the file server. The scenario file analyzer 23 further identifies the other entity, such as the other file server, which is to perform the subsequent processing request. The processing request obtainer 24 obtains the processing request addressed to the file server based on the analysis result of the scenario file. The processing request executor 25 executes the processing request obtained by the processing request obtainer 24.

The scenario file update 26 updates the contents of the scenario file based on the execution result of the processing request, to generate an updated scenario file.

The message generator 27 generates a message including the updated scenario file. Based on the analysis result of the scenario file, the message generator 27 identifies the other file server, which is the entity that executes the subsequent processing request. The message generator 27 further generates a message including the updated scenario file, addressed to the other file server that performs the subsequent processing request.

Figure 8:
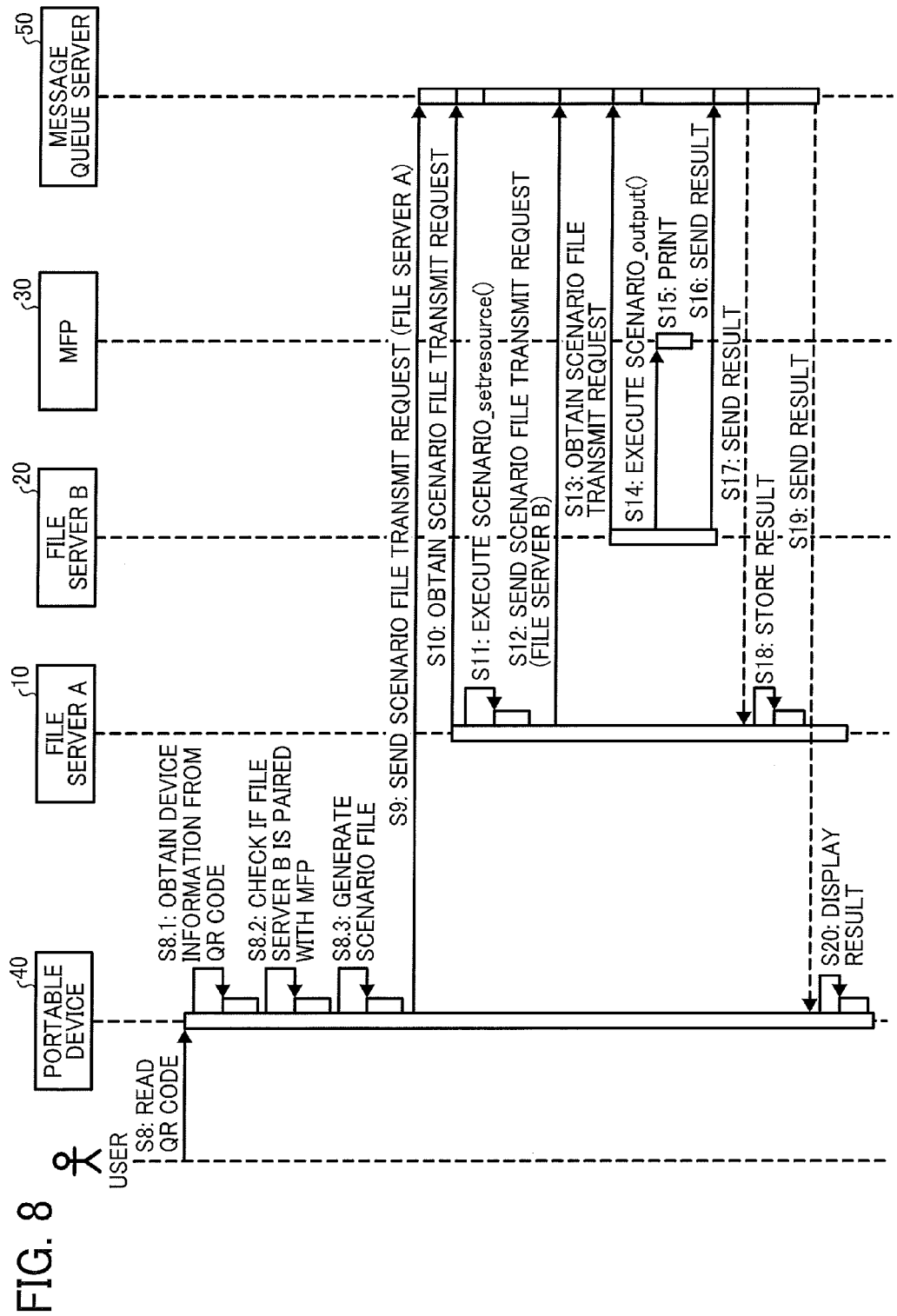
FIG. 8 is a data sequence diagram illustrating operation of processing the request for outputting data stored in the file server, performed by the information processing system of FIG. 3, after the operation of FIG. 4.

Referring now to FIGS. 4 and 8, operation of processing a request for outputting an image of electronic data, performed by the file server system 100, is explained according to an example embodiment of the present invention. In this example, it is assumed that pairing is completed for each apparatus in the file server system 100 such that settings information is shared between or among the apparatuses to communicate data between or among the apparatuses. Further, in this example, the portable device 40 is implemented as a smart phone operated by the user. For simplicity, the portable device 40 may be referred to as the smart phone 40.

Figure 5B:
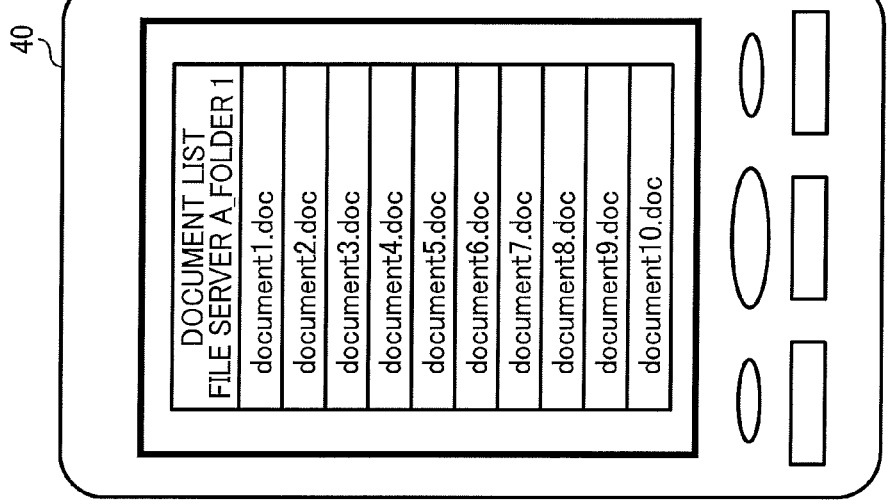
FIG. 5B is an illustration of an example screen displayed on the portable device of FIG. 2.
Figure 5A:
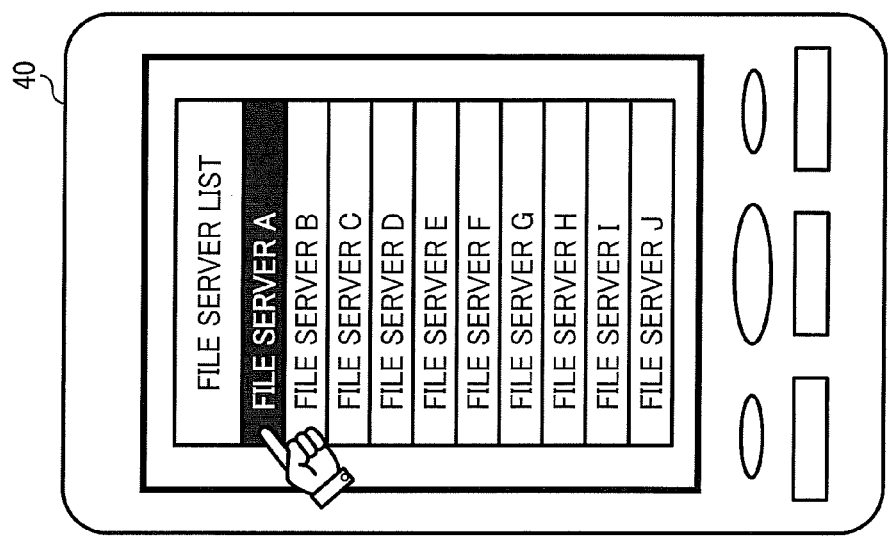
FIG. 5A is an illustration of an example screen displayed on a portable device of FIG. 2.

At S1, the user instructs the smart phone 40 to display one or more electronic data files ("data list") that are available for selection by the user. For example, as illustrated in FIG. 5A, the user selects the file server A from a list of file servers ("file server list") that are available, which is displayed on the touch panel of the smart phone 40. In this example, the smart phone 40 displays one or more file servers that are managed by the file server system 100.

In response to the user selection, at S1.1, the smart phone 40 generates a message that requests to obtain a data list ("data list obtaining request"), while addressing the selected file server A. For example, information indicating the file server A, such as the address assigned to the file server A, may be entered into a predetermined data field of the message. The smart phone 40 further sends the data list obtaining request to the message queue server 50. The message queue server 50 stores the message, i.e., the data list obtaining request, in the message queue 52.

Assuming that the file server A periodically sends a message obtaining request to the message queue server 50, at S2, the file server A obtains the data list obtaining request addressed to the file server A, which is stored in the message queue 52, from the message queue server 50.

At S3, the file server A generates a list of one or more electronic data files ("data list"), which are stored in the file server A, in response to the data list obtaining request.

At S4, the file server A generates a message that requests to send a data list ("data list transmit request"), while addressing the portable phone 40, and sends the data list transmit request to the message queue server 50.

At S5, the message queue server 50, which receives the data list transmit request from the file server A, sends the data list to the smart phone 40 as specified by the address of the message. As described above referring to FIG. 2, the message queue server 50 is able to communicate with the portable device 40 via the external network 102 and the 3G network.

At S1.2, the smart phone 40 displays the data list received from the message queue server 50. For example, as illustrated in FIG. 5B, the smart phone 40 displays a list of file names of electronic data files that are stored in a folder 1 of the file server A, on the touch panel of the smart phone 40. In this example, the data list ("document list") lists the total of document files.

At S6, the user selects at least one electronic data file from the data list to instruct printing of the selected file, for example, by touching the touch panel of the smart phone 40. In this example, as illustrated in FIG. 6A, it is assumed that the user selects the electronic data file having the file name "document1.doc", from the data list being displayed on the touch panel of the smart phone 40. In response to the user selection, the smart phone 40 automatically switches the display of the touch panel from the data list screen of FIG. 6A to a QR code reader screen of FIG. 6B. More specifically, the smart phone 40 executes the QR code reader 49 to be ready for reading a QR code.

Figure 6B:
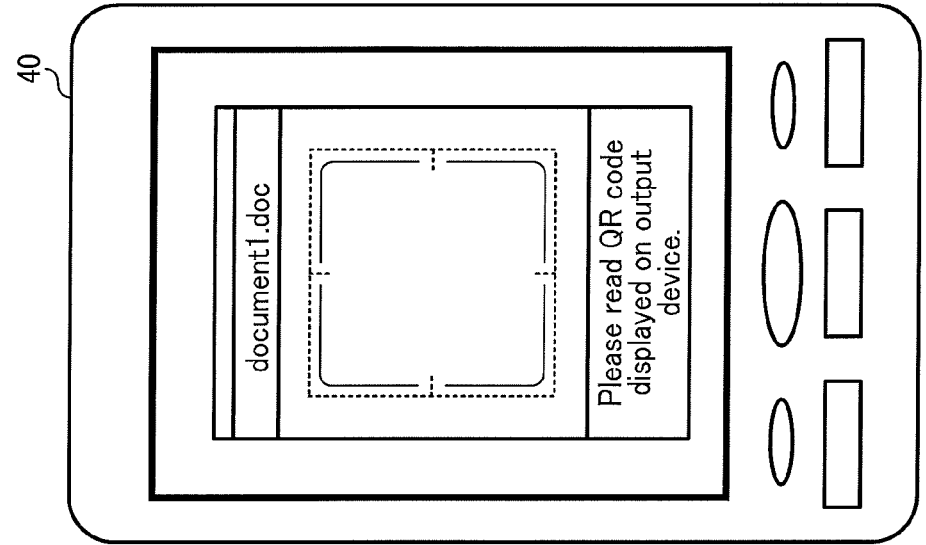
FIG. 6B is an illustration of an example screen displayed on the portable device of FIG. 2.
Figure 6A:
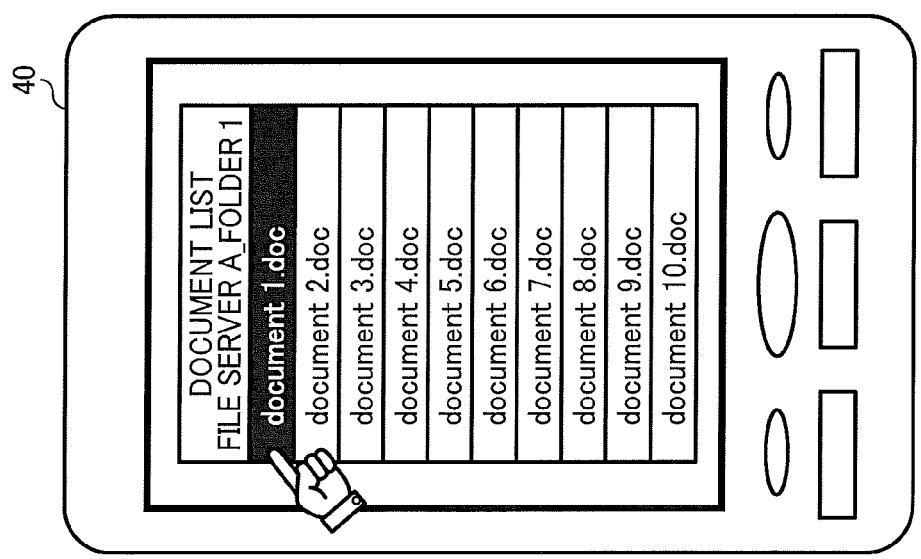
FIG. 6A is an illustration of an example screen displayed on the portable device of FIG. 2.

The QR code reader screen of FIG. 6B further instructs the user to read a QR code, which is displayed on an output apparatus that outputs a print image of the selected electronic data file "document1", by displaying the message. In this example, it is assumed that the user selects the MFP 30 as an output apparatus that outputs the print image of the electronic data file "document1". As illustrated in FIG. 7A, at S7, the user operates the operation panel 38 of the MFP 30 to select the icon "Display QR code" being displayed.

In response to the user instruction, at S7.1, the MFP 30 obtains device information of the MFP 30. At S7.2, the MFP 30 searches for one or more file servers that reside on the local network B and communicable with the MFP 30. In this example, it is assumed that the file server B is found. At S7.3, the MFP 30 obtains device information of the file server B, from the file server B.

In this example, device information is any information that can be used to identify the apparatus such as the MFP 30 or the file server B. Examples of the device information include, but not limited to, a device ID, an IP address, a contact ID, a device ID, and a device ID of a counterpart device capable of communicating with that device ("accessible device"). The contact ID is a device ID, which is assigned to the apparatus such as the file server, during pairing processing under control of the message queue server 50.

At S7.4, the MFP 30 generates a QR code, in which the device information of the MFP 30 and the device information of the file server B are embedded, using the QR code generator 34. The QR code display 36 of the MFP 30 further displays the QR code on the operation panel 38 of the MFP 30, for example, as illustrated in FIG. 7B. The screen of FIG. 7B further instructs the user to read the QR code, by displaying the message "Please read this QR code with dedicated application".

Figure 9A:
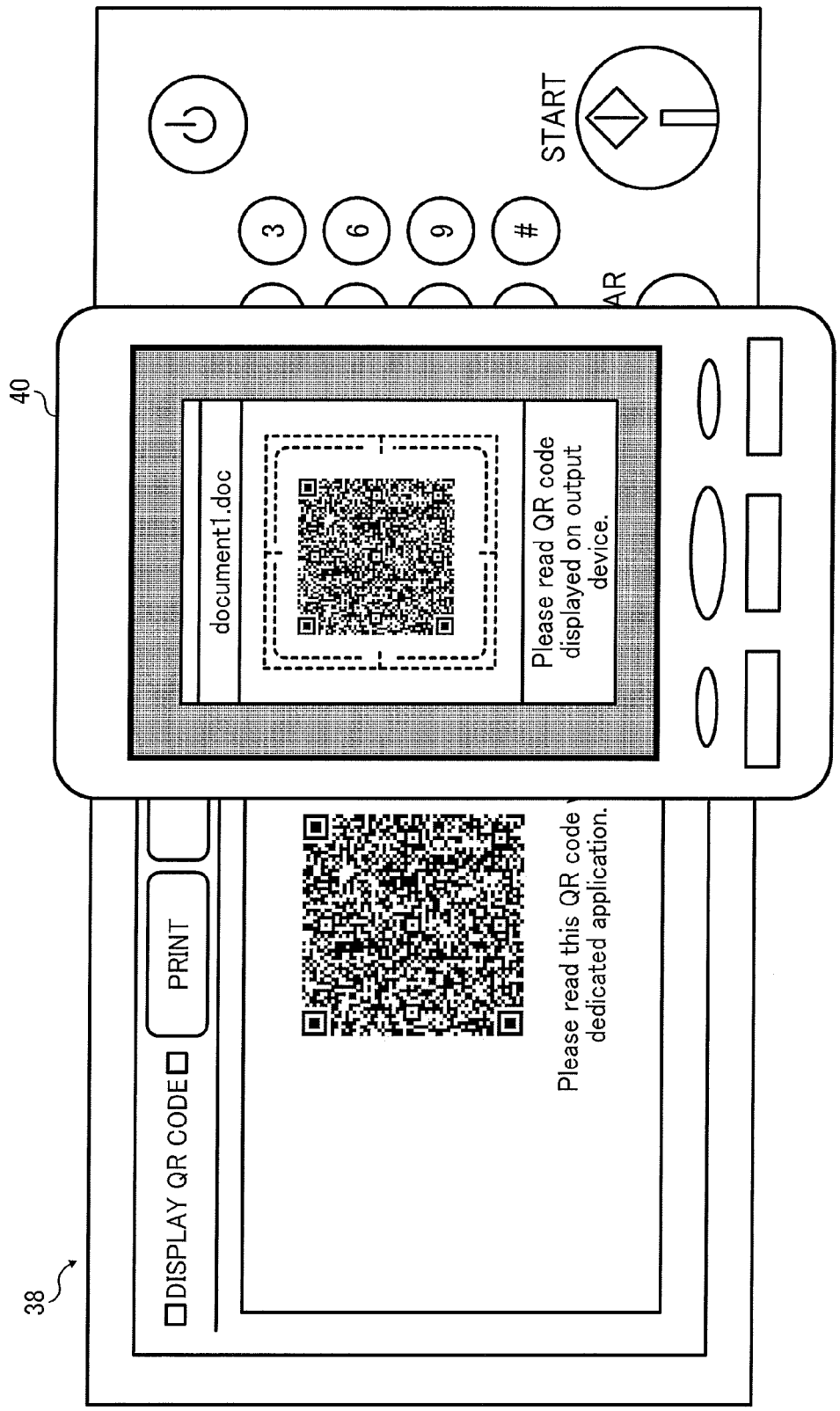
FIG. 9A is an illustration of an example screen displayed on the portable device of FIG. 2.

The operation further proceeds to S8 of FIG. 8. At S8, as illustrated in FIG. 9A, the smart phone 40, which activates the QR code reader 49, captures the QR code image displayed on the operation panel 38, according to a user instruction. As described above, the QR code reader 49 may be implemented by the camera previously installed on the smart phone 40.

At S8.1, the smart phone 40 analyzes the QR code being captured, and obtains the device information of the MFP 30 and the device information of the file server B from the QR code, for example, using the device information obtainer 48.

Figure 10A:
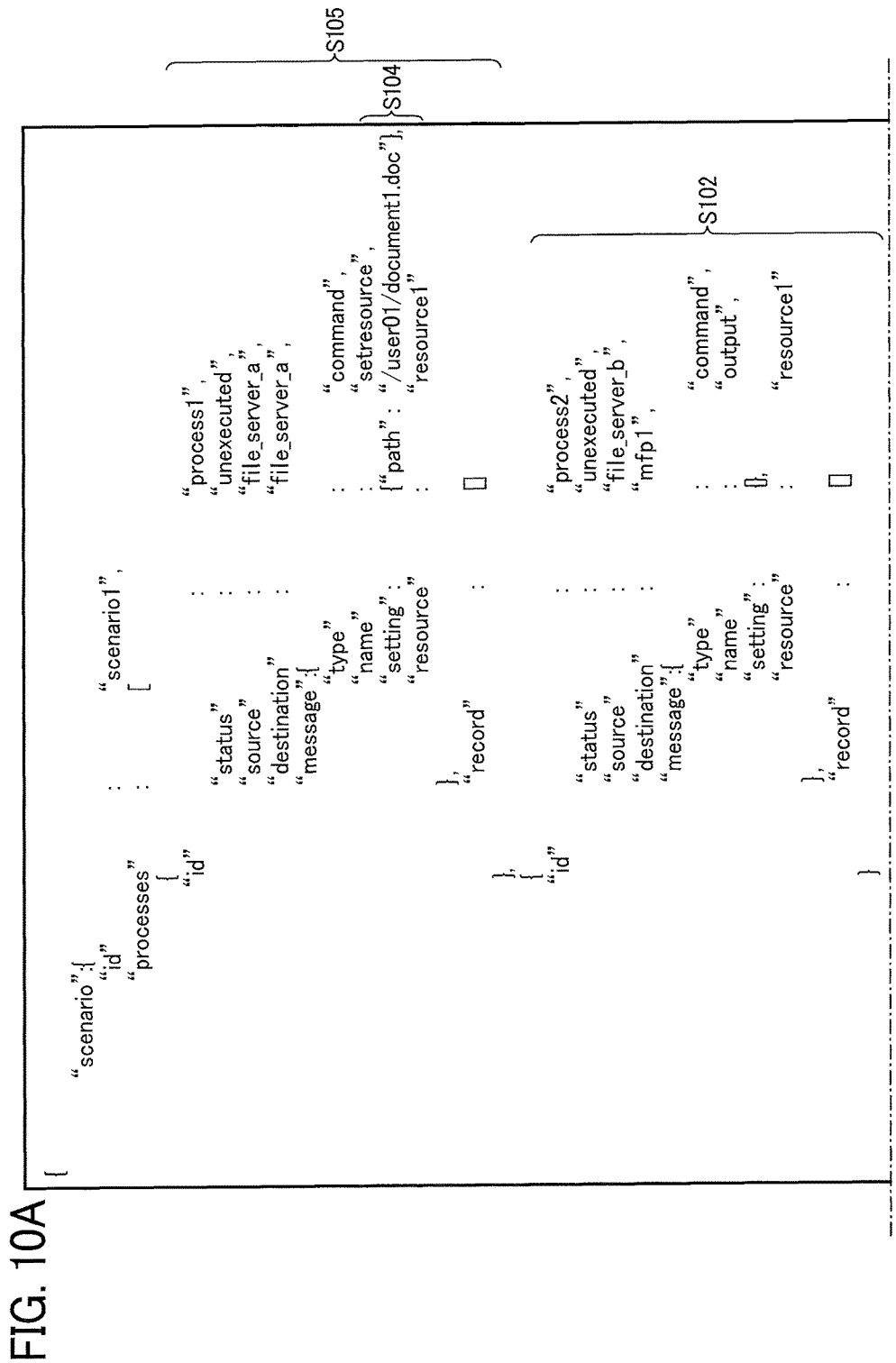
FIGS. 10A and 10B are an illustration of an example data structure of a scenario file, generated by the portable device of FIG. 2.
Figure 10B:
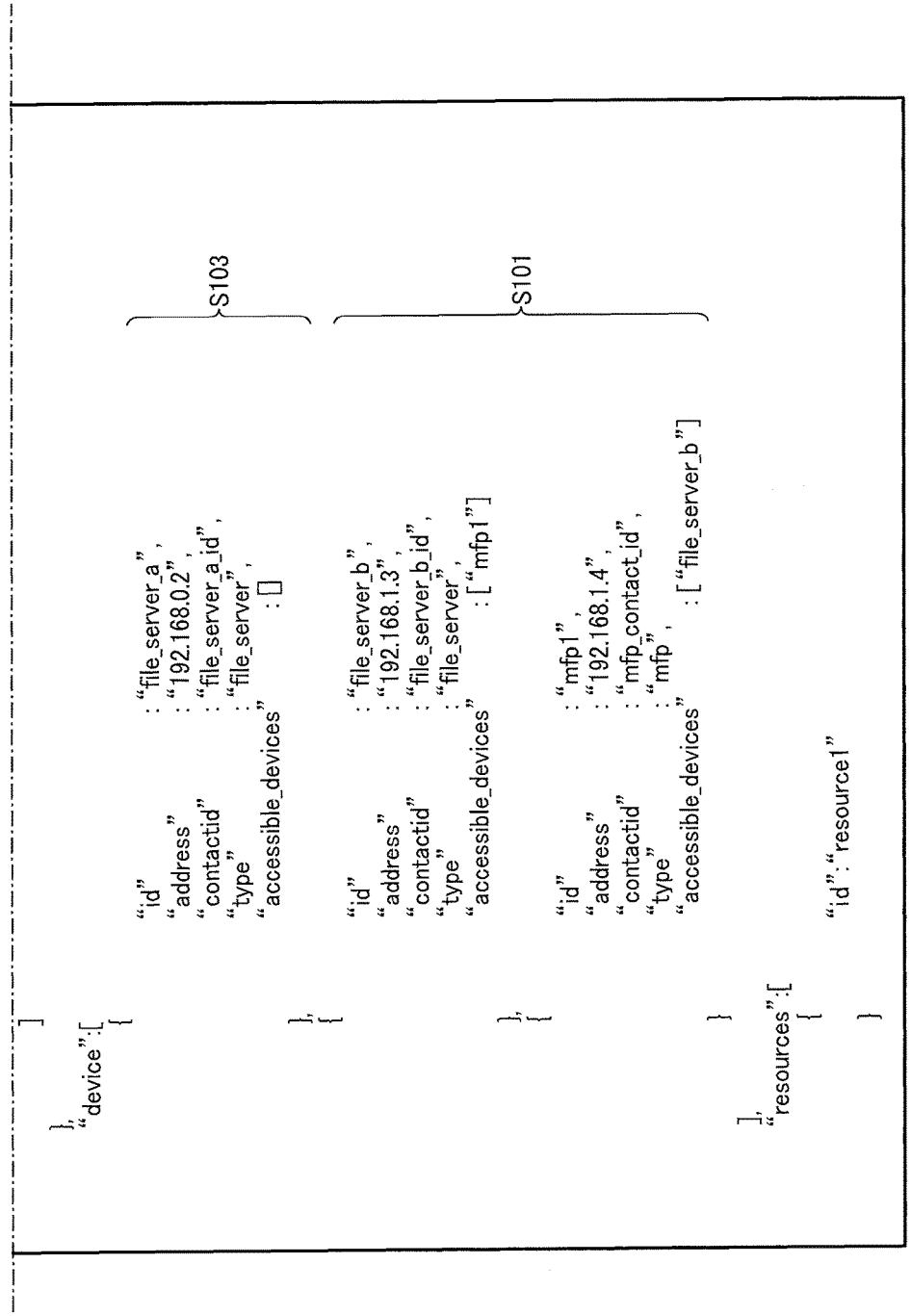
Figure 11:
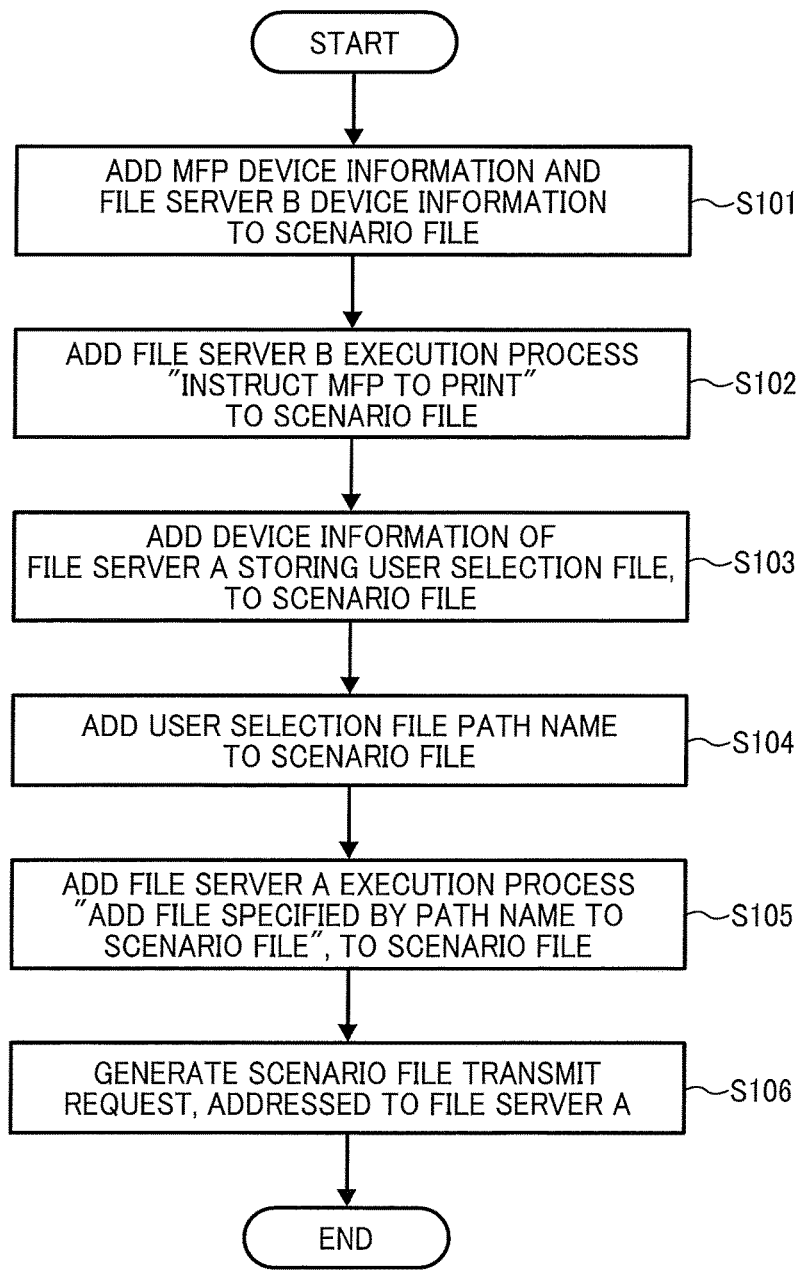
FIG. 11 is a flowchart illustrating operation of generating a scenario file, performed by the portable device of FIG. 2, according to an example embodiment of the present invention.

After confirming that the file server B is paired with the MFP 30 at S8.2, at S8.3, the smart phone 40 generates a scenario file. For example, the scenario file generator 46 of the smart phone 40 generates a scenario file as illustrated in FIGS. 10A and 10B (FIG. 10). Referring now to FIGS. 10 and 11, operation of generating a scenario file, performed by the smart phone 40, is explained according to an example embodiment of the present invention.

In this example, the dedicated application installed on the smart phone 40, such as the scenario file generator 46, generates a scenario file describing a plurality of processing requests to be performed by different entities, and the order of executing the processing requests.

At S101, the scenario file generator 46 adds the device information of the MFP 30 and the device information of the file server B, which are respectively obtained by analyzing the QR code, to the scenario file. For example, as indicated by S101 of FIG. 10, as the device information of the file server B, the device ID "file_server_b", the IP address "192.168.1.3", the contact ID "file_server_b_id", the device type "file_server", and the device ID of the accessible device "mfp1" are added. As the device information of the MFP 30, the device ID "mfp1", the IP address "192.168.1.4", the contact ID "mfp1_contact_id", the device type "mfp", and the device ID of the accessible device "file_server_b" are added.

At S102, the scenario file generator 46 adds a process to be executed by the file server B to the scenario file, such as the process to instruct the MFP 30 to print a resource. For example, as indicated by S102 of FIG. 10, the processing request being added to the scenario file indicates that the file server B "file_server_b" is an entity ("source") that executes the process to instruct the MFP 30 "mfp1" ("destination") to "output" the "resource1" ("resource"). This processing request is assigned with an ID "process2".

At S103, the scenario file generator 46 adds the device information of the file server A, which stores the user selection file "document1.doc", to the scenario file. For example, as indicated by S103 of FIG. 10, as the device information of the file server A, the device ID "file_server_a", the IP address "192.168.0.2", the contact ID "file_server_a_id", the device type "file_server", and the accessible device "blank (none)" are added.

At S104, the scenario file generator 46 adds the path name of the user selection file "document1.doc" to the scenario file. For example, as indicated by S104 of FIG. 10, the path name "/user01/document1.doc" is added.

At S105, the scenario file generator 46 adds the process to be executed by the file server A, which is to add the "resource" specified by the path name identified at S104 to the scenario file, to the scenario file. For example, as indicated by S105 of FIG. 10, the processing request being added to the scenario file indicates that the file server A "file_server_a" is an entity that executes the process to add the resource "resource1" identified by the path name "/user01/document1.doc" to the scenario file. This processing request is assigned with an ID "process1".

The scenario file generated as described above describes the processing requests to be performed by the file servers (in this example, the file servers A and B), and the order of executing the processing requests.

At S106, the scenario file generator 46 generates a scenario file transmit request message, addressed to the file server A that is the entity that performs the first processing request "process1", and the operation ends. In this example, the contact ID of the file server A is used as an address of the message.

Referring back to FIG. 8, after the smart phone 40 generates the scenario file at S8.3, at S9, the smart phone 40 sends the scenario file transmit request message, addressed to the file server A, to the message queue server 50. The message queue server 50 stores the message, i.e., the scenario file transmit request, in the message queue 52.

Assuming that the file server A periodically sends a message obtaining request to the message queue server 50, at S10, the file server A obtains the scenario file transmit request addressed to the file server A, from the message queue server 50. At S11, the file server A executes a scenario, based on description of the scenario file.

Figure 13:
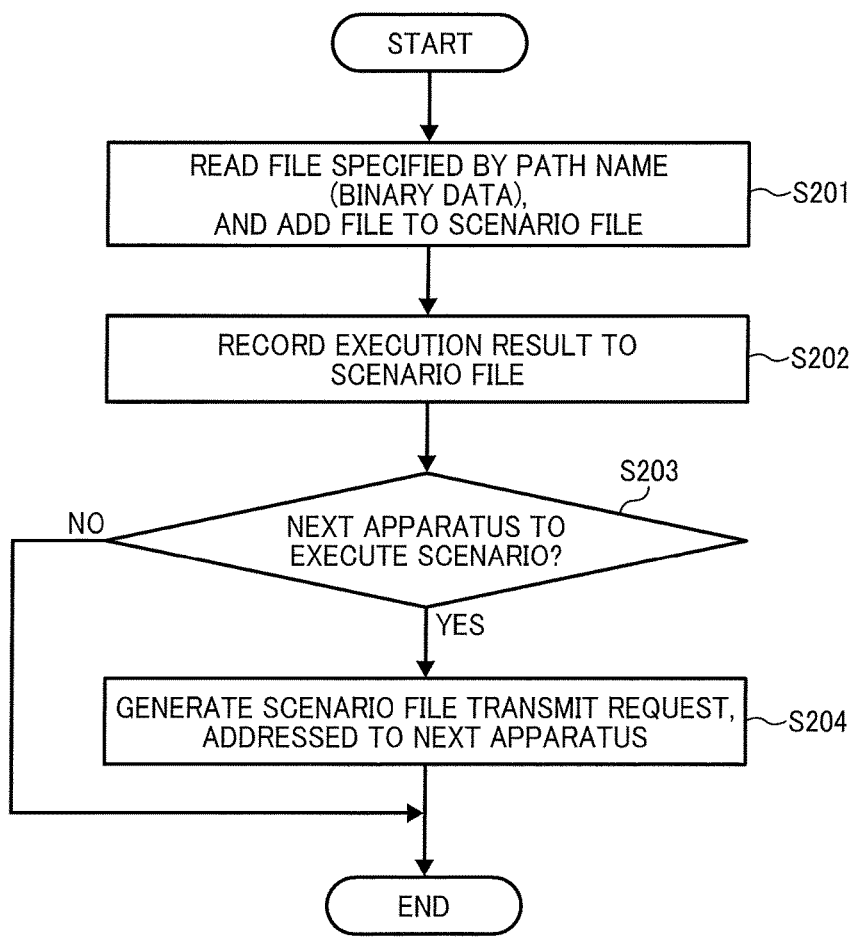
FIG. 13 is a flowchart illustrating operation of updating the scenario file and generating a message including the updated scenario file, performed by the file server of the information processing system of FIG. 2, according to an example embodiment of the present invention.

FIGS. 12A and 12B (FIG. 12) illustrate an example data structure of the scenario file, which is updated after the file server A executes the scenario based on the scenario file at S11. Referring now to FIGS. 12 and 13, operation of updating the scenario file, performed by the file server A, is explained according to an example embodiment of the present invention.

More specifically, the scenario file analyzer 23 of the file server A analyzes the scenario described in the obtained scenario file to detect the processing request to be executed by the file server A. In this example, the scenario file analyzer 23 detects the processing request "process1" as the processing request to be executed at the file server A. Based on this analysis result, the processing request obtainer 24 obtains the processing request "process1". The processing request executor 25 executes the obtained processing request "process1". The scenario file update 26 updates the scenario file so as to reflect the execution result of the processing request "process1".

More specifically, at S201 of FIG. 13, the scenario file update 26 reads out an electronic data file "document1.doc" identified by the path name of the scenario file, that is, binary data, and adds the obtained binary data to the scenario file. For example, as indicated by S201 (2) of FIG. 12B, the binary data of the resource "resource1" identified by the path name "/user01/document1.doc" is added to the end of the scenario file.

At S202, the scenario file update 26 records the execution result of the scenario, to the scenario file. For example, as indicated by S202 of FIG. 12, the execution result "result" of the processing request "process1" performed by the file server A indicates that it is successful.

The scenario file analyzer 23 of the file server A detects an entity that executes the subsequent processing request. Based on the analysis result, the message generator 27 generates a message, which causes the scenario file to be transmitted to the entity to perform the subsequent processing request.

Referring to FIG. 13, at S203, the scenario file analyzer 23 determines whether there is any apparatus that executes the scenario. When it is determined that there is at least one apparatus that executes the scenario ("YES" at S203), the operation proceeds to S204. More specifically, in this example, at S203, the scenario file analyzer 23 detects the file server B "file_server_b", which is to perform the processing request "process2" having the "unexecuted" status, as the entity to perform the subsequent processing request ("YES" at S203).

At S204, the message generator 27 generates a scenario file transmit request message, addressed to the file server B that is detected at S203, and the operation ends. In this example, the contact ID of the file server B is used as the address of the message.

Referring back to FIG. 8, after the file server A generates the message including the scenario file that is updated to reflect the execution result of the scenario by the file server A, at S12, the file server A transmits the scenario file transmit request message addressed to the file server B, to the message queue server 50. The message queue server 50 stores the scenario file transmit request message in the message queue 52.

Assuming that the file server B periodically sends a message obtaining request to the message queue server 50, at S13, the file server B obtains the scenario file transmit request addressed to the file server B, from the message queue server 50. At S14, the file server B executes the scenario based on description of the obtained scenario file.

Figure 15:
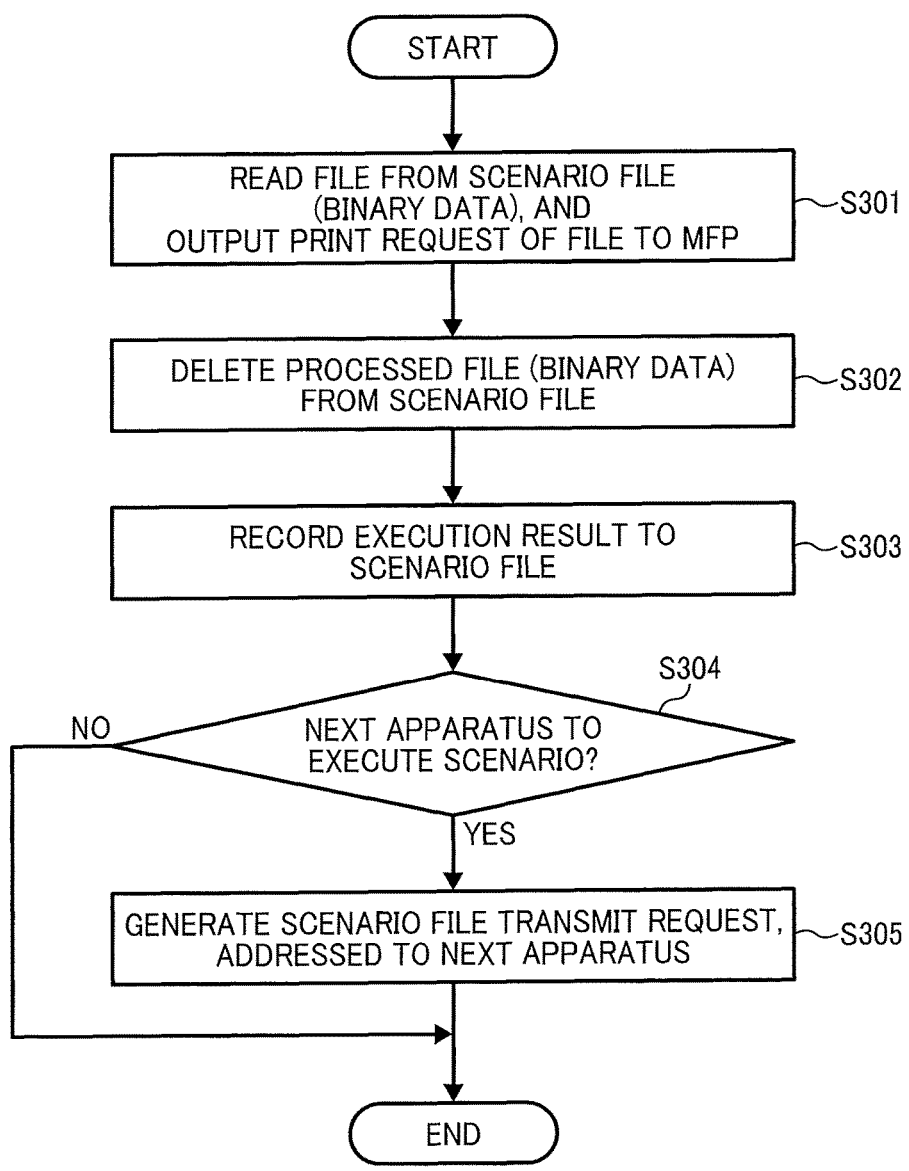
FIG. 15 is a flowchart illustrating operation of updating the scenario file and generating a message including the scenario file, performed by the file server of the information processing system of FIG. 2, according to an example embodiment of the present invention.

FIGS. 14A and 14B (FIG. 14) illustrate an example data structure of the scenario file, which is updated after the file server B executes the scenario at S14. Referring now to FIGS. 14 and 15, operation of updating the scenario file, performed by the file server B, is explained according to an example embodiment of the present invention.

More specifically, the scenario file analyzer 23 of the file serer B analyzes the scenario described in the obtained scenario file to detect the processing request to be executed by the file server B. In this example, the scenario file analyzer 23 detects the processing request "process2" as the processing request to be executed at the file server B. Based on this analysis result, the processing request obtainer 24 obtains the processing request "process2". The processing request executor 25 executes the obtained processing request "process2". The scenario file update 26 updates the scenario file so as to reflect the execution result of the processing request "process2".

More specifically, at S301 of FIG. 15, the scenario file update 26 reads out the binary data of the file "document1.doc", which is attached at the end of the scenario file, and sends an instruction for printing the read file "document1.doc" to the MFP 30. For example, as indicted by S301 of FIG. 14, the "status" of the processing request "process1" is changed to "executed".

At S302, the file server B deletes the binary data of the file "document1.doc" from the scenario file. For example, as indicated by S302 of FIG. 14, the resource to be processed is deleted from the field "resources".

At S303, the scenario file update 26 records the execution result of the scenario, to the scenario file. For example, as indicated by S303 of FIG. 14, the execution result "result" of the processing request "process2" performed by the file server B indicates that it is successful.

The scenario file analyzer 23 of the file server B detects an entity that executes the subsequent processing request. Based on the analysis result, the message generator 27 generates a message, which causes the scenario file to be transmitted to the entity performing the subsequent processing request.

Referring to FIG. 15, at S304, the scenario file analyzer 23 determines whether there is any apparatus that executes the subsequent processing request of the scenario, for example, by searching for a processing request having the "unexecuted" status. In this example, it is assumed that there is no apparatus that executes the scenario ("NO" at S304), and the operation ends.

Referring back to FIG. 8, as the file server B executes the scenario at S14, the instruction for printing the file "document1.doc" is output to the MFP 30. At S15, the MFP converts the electronic data file "document1.doc" to print data, and outputs a printed image of the file "document1.doc".

In response to completion of printing by the MFP 30, at S16, the file server B sends a result transmit request message to the message queue server 50. The result transmit request message is addressed to the file server A and the smart phone 40.

At S17, the message queue server 50 sends the processing result indicating that printing is completed to the file server A. For example, in response to the message obtaining request that is periodically transmitted from the file server A, the message queue server 50 sends the processing request indicating that printing is completed.

At S19, the message queue server 50 sends the processing result indicating that printing is completed to the smart phone 40.

At S18, the file server A stores the processing result as a log.

At S20, the smart phone 40 displays the processing result indicating that printing is completed, on the display, as illustrated in FIG. 9B.

Figure 16:
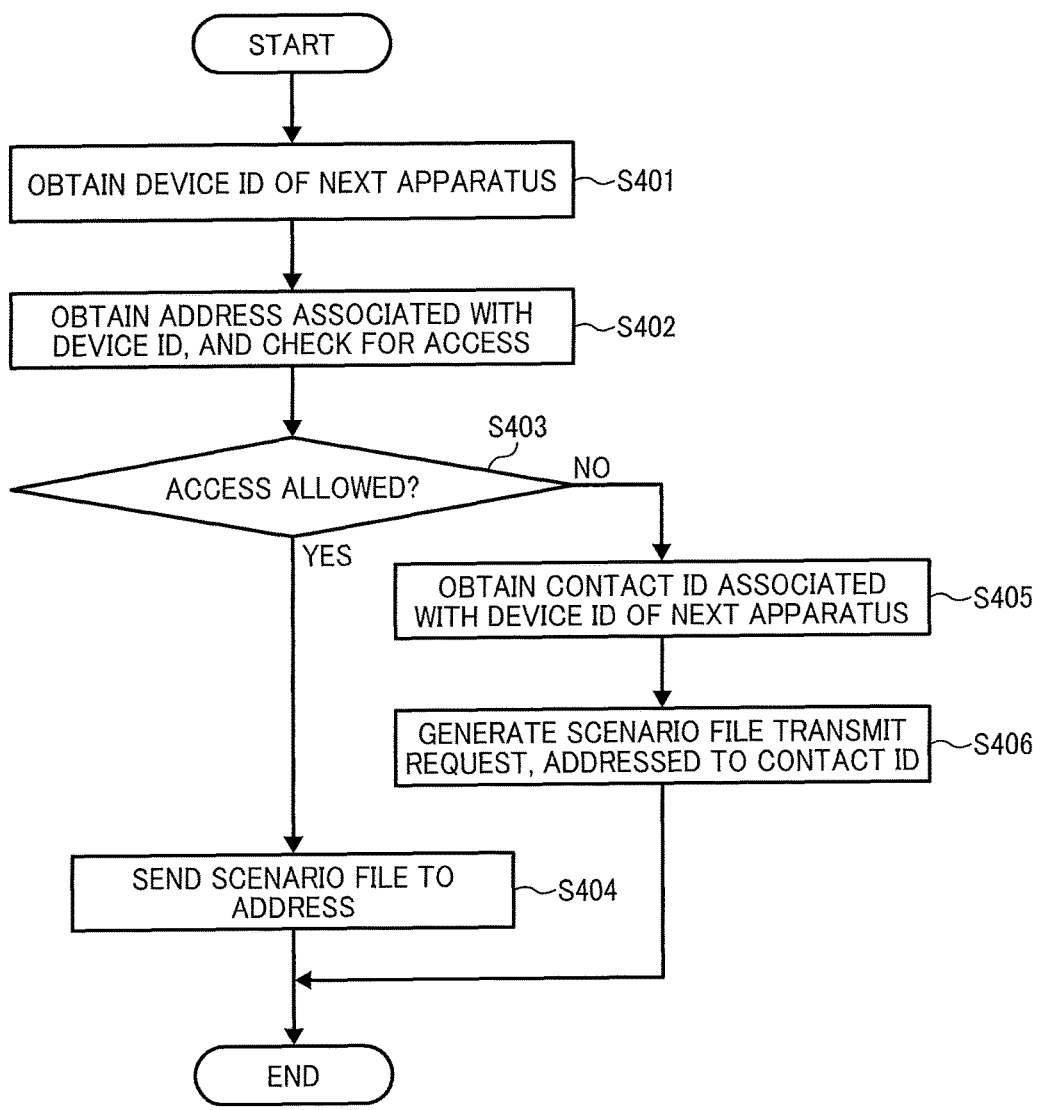
FIG. 16 is a flowchart illustrating operation of dynamically selecting a communication method, performed by the file server of the information processing system of FIG. 2, according to an example embodiment of the present invention.
Figure 17B:
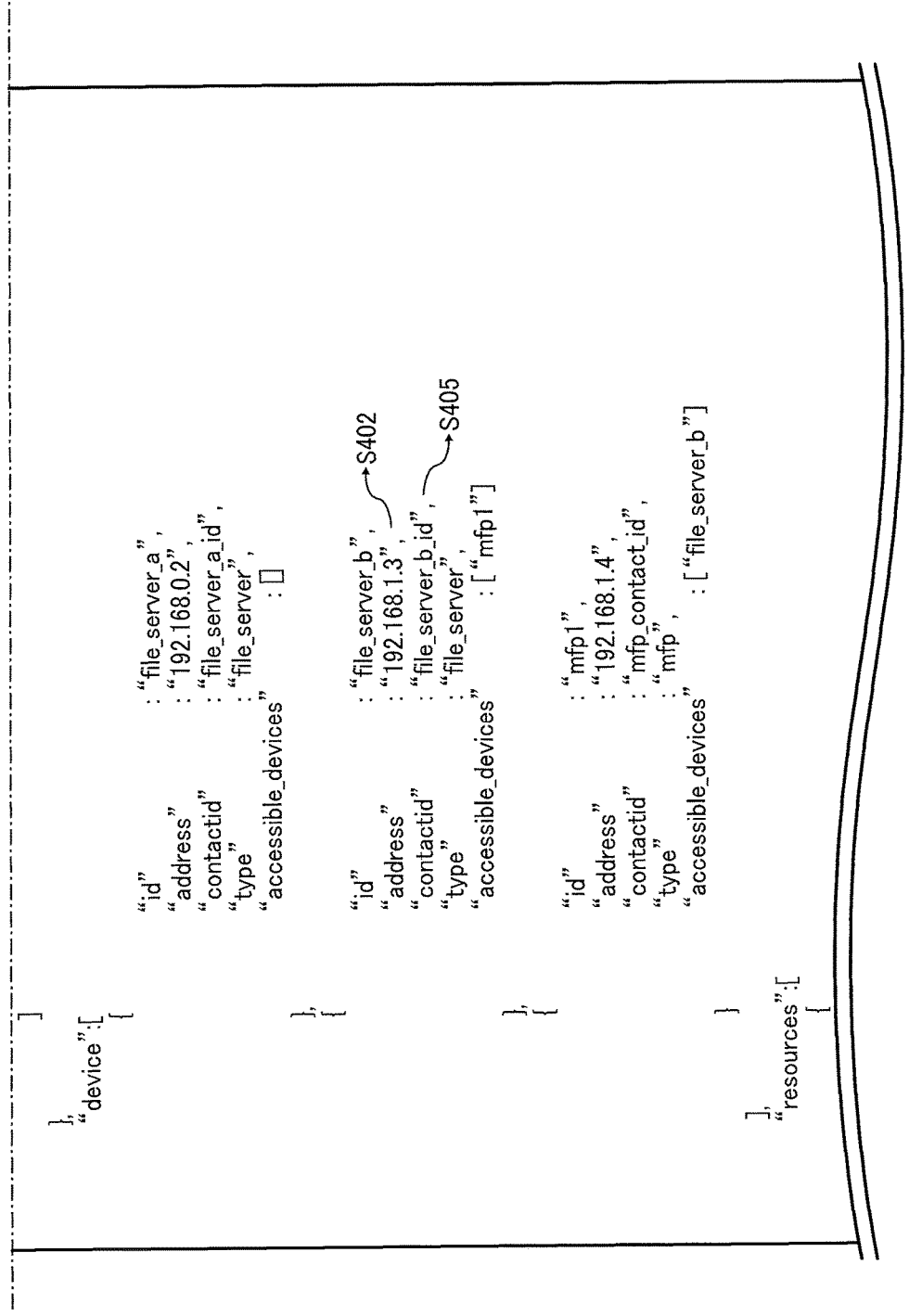

Referring now to FIGS. 16 and 17, operation of dynamically selecting a method of communicating with the other apparatus, performed by the apparatus the executes the processing request described by the scenario file, is explained according to an example embodiment of the present invention. For the descriptive purposes, in the following example, it is assumed that the file server A performs operation of FIG. 16, after executing the processing request "process1". FIGS. 17A and 17B (FIG. 17) is the scenario file, which reflects that the processing request is successful performed at the file server A.

At S401, the file server A, which has executed the processing request "process1", analyzes the scenario file of FIG. 17 to obtain a device ID of the apparatus performing the subsequent processing request. In this example, the file server A obtains the device ID "file_server_b" of the file server B, which is specified as the "source" for the processing request "process2" having the "unexecuted" status.

At S402, the file server A obtains the IP address "192.168.1.3", which is associated with the device ID of the apparatus to which the scenario file is transmitted. As indicated by S402 of FIG. 17, the address "192.168.1.3" for the file server B can be obtained.

At S403, the file server A determines whether the file server B can be accessed, for example, by transmitting the PING command to the address of the file server B.

If the file server B resides on the same local network of the file server A, it is determined that the file server B can be directly accessed ("YES" at S403). In such case, the operation proceeds to S404. At S404, the file server A transmits the scenario file, while addressing the IP address "192.168.1.3" of the file server B, and the operation ends.

Alternatively, if the file server B resides on the local network different from the local network of the file server A, it is determined that the file server B cannot be directly accessed ("NO" at S403). In such case, the operation proceeds to S405. At S405, the file server A analyzes the scenario file to obtain the contact ID "file_server_b_id" associated with the device ID "file_server_b". As indicated by S405 of FIG. 17, the contact ID "file_server_b_id" for the file server B can be obtained.

At S406, the file server A generates a scenario file transmit request message, addressing to the contact ID "file_server_b_id" of the file server B, and sends the scenario file transmit request message to the message queue server 50.

As described above, in response to the user instruction input to the portable device 40, the MFP 30 in the office B is able to output a printed image of the electronic data file "document1" stored in the file server A in the office A, via the file server B in the office B. More specifically, the message queue server 50, which receives the user instruction from the portable device 40, operates in cooperation with the file sever such as the file server A and the file server B to execute one or more processing requests as defined by the user instruction.

Referring now to FIGS. 1, 2, and 18 to 23, operation of printing data stored in the file server B is explained according to an example embodiment of the present invention. In this example, the user in the office B operates the portable device 40 to instruct to print an electronic data file "document2" stored in the file server B in the office B. In such case, the MFP 30 obtains the electronic data file "document2" from the file server B to output a printed image based on the file "document2". The operation of printing data stored in the file server B is performed in a substantially similar manner as the operation of printing data stored in the file server A, except for some differences.

Figure 18:
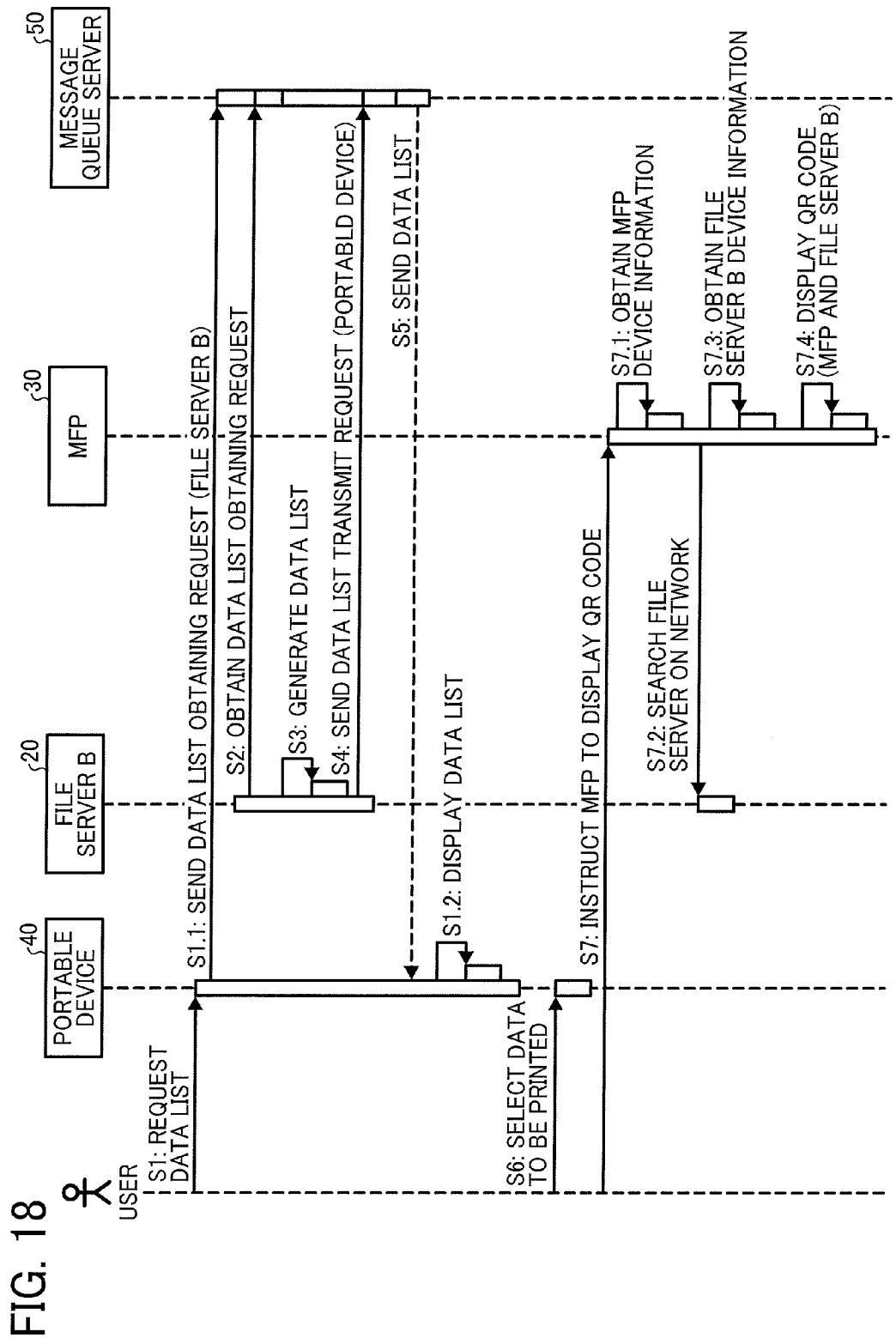
FIG. 18 is a data sequence diagram illustrating operation of processing a request for outputting data stored in a file server, performed by the information processing system of FIG. 2, according to an example embodiment of the present invention.
Figure 19:
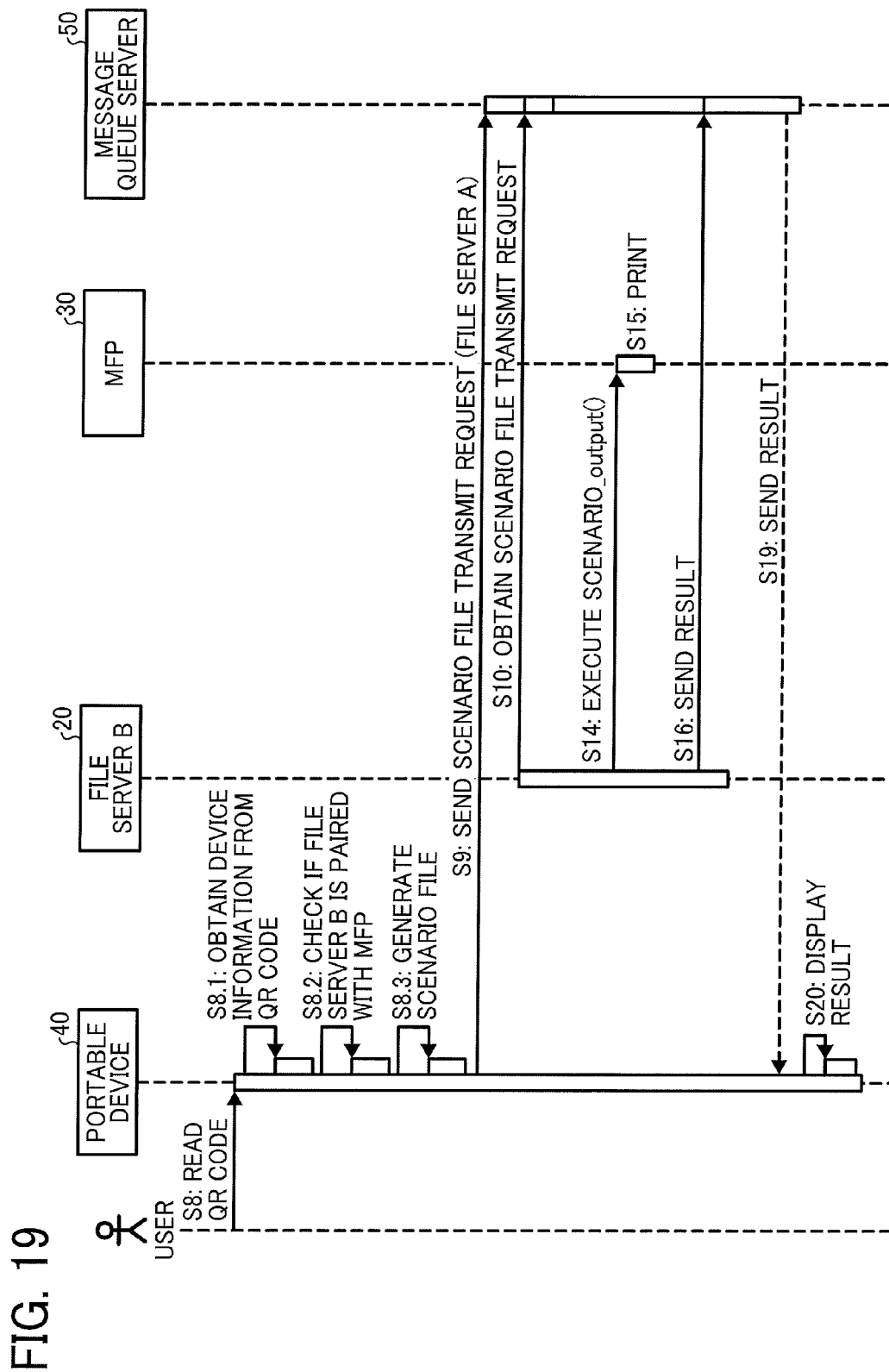
FIG. 19 is a data sequence diagram illustrating operation of processing the request for outputting data stored in the file server, performed by the information processing system of FIG. 2, after the operation of FIG. 18.

Referring now to FIGS. 18 and 19, operation of processing a request for outputting an electronic data file, performed by the file server system 100, is explained according to an example embodiment of the present invention. In this example, it is assumed that pairing is completed for each apparatus in the file server system 100 such that settings information is shared between or among the apparatuses to communicate data between or among the apparatuses. Further, in this example, the portable device 40 is implemented as a smart phone operated by the user. For simplicity, the portable device 40 may be referred to as the smart phone 40.

At S1, the user instructs the smart phone 40 to display one or more electronic data files ("data list") that are available for selection by the user, in a substantially similar manner as described above referring to S1 of FIG. 4. In this example, the user selects the file server B from the list of file servers that are available, which is displayed on the touch panel of the smart phone 40.

In response to the user selection, at S1.1, the smart phone 40 generates a message that requests to obtain a data list ("data list obtaining request"), while addressing the selected file server B. The smart phone 40 further sends the data list obtaining request to the message queue server 50. The message queue server 50 stores the message, i.e., the data list obtaining request, in the message queue 52.

In case there is only one file server available for user selection, the smart phone 40 does not have to display the "file server list" for user selection. In such case, in response to the user request for data list at S1, the portable device 40 may generate a message that requests to obtain a data list ("data list obtaining request"), while addressing the file server that is available for use, and sends the message to the message queue server 50.

Assuming that the file server B periodically sends a message obtaining request to the message queue server 50, at S2, the file server B obtains the data list obtaining request addressed to the file server B, which is stored in the message queue 52, from the message queue server 50.

At S3, the file server B generates a list of one or more electronic data files ("data list"), which are stored in the file server B, in response to the data list obtaining request.

At S4, the file server B generates a message that requests to send a data list ("data list transmit request"), while addressing the portable phone 40, and sends the data list transmit request to the message queue server 50.

At S5, the message queue server 50, which receives the data list transmit request from the file server B, sends the data list to the smart phone 40 as specified by the address of the message.

At S1.2, the smart phone 40 displays the data list received from the message queue server 50, in a substantially similar manner as described above referring to S1.2 of FIG. 4.

At S6, the user selects at least one electronic data file from the data list to instruct printing of the selected file. In this example, it is assumed that the user selects the electronic data file having the file name "document2.doc", from the data list being displayed on the touch panel of the smart phone 40. In response to the user selection, the smart phone 40 automatically switches the display of the touch panel from the data list screen of FIG. 6A to the QR code reader screen of FIG. 6B. More specifically, the smart phone 40 executes the QR code reader 49 to be ready for reading a QR code.

At S7, the user operates the operation panel 38 of the MFP 30 to select the icon "Display QR code" being displayed.

At S7.1, the MFP 30 obtains device information of the MFP 30. At S7.2, the MFP searches for one or more file servers that reside on the local network B and communicable with the MFP 30. In this example, it is assumed that the file server B is found. At S7.3, the MFP 30 obtains device information of the file server B, from the file server B.

At S7.4, the MFP 30 generates a QR code, in which the device information of the MFP 30 and the device information of the file server B are embedded, using the QR code generator 34. The QR code display 36 of the MFP 30 further displays the QR code on the operation panel 38 of the MFP 30.

The operation further proceeds to S8 of FIG. 19. At S8, the smart phone 40, which activates the QR code reader 49, captures the QR code image displayed on the operation panel 38, according to a user instruction.

At S8.1, the smart phone 40 analyzes the QR code being captured, and obtains the device information of the MFP 30 and the device information of the file server B from the QR code, using the device information obtainer 48.

After confirming that the file server B is paired with the MFP 30 at S8.2, at S8.3, the smart phone 40 generates a scenario file. For example, the scenario file generator 46 of the smart phone 40 generates a scenario file as illustrated in FIGS. 20A and 20B (FIG. 20). Referring now to FIGS. 20 and 21, operation of generating a scenario file, performed by the smart phone 40, is explained according to an example embodiment of the present invention.

At S501, the dedicated application installed on the smart phone 40, such as the scenario file generator 46, adds the device information of the MFP 30 and the device information of the file server B, which are respectively obtained by analyzing the QR code, to the scenario file. For example, as indicated by S501 of FIG. 20, as the device information of the file server B, the device ID "file_server_b", the IP address "192.168.1.3", the contact ID "file_server_b_id", the device type "file_server", and the device ID of the accessible device "mfp1" are added. As the device information of the MFP 30, the device ID "mfp1", the IP address "192.168.1.4", the contact ID "mfp1_contact_id", the device type "mfp", and the device ID of the accessible device "file_server_b" are added.

At S502, the scenario file generator 46 adds a process to be executed by the file server B to the scenario file, such as the process to instruct the MFP 30 to print a resource. For example, as indicated by S502 of FIG. 20, the processing request being added to the scenario file indicates that the file server B "file_server_b" is an entity that executes the process to instruct the MFP 30 "mfp1" to "output" the "resource1". This processing request is assigned with an ID "process1".

At S503, the scenario file generator 46 adds the path name of the user selection file "document2.doc" to the scenario file. For example, as indicated by S503 of FIG. 20, the path name "/user01/document2.doc" is added.

The scenario file generated as describe above describes the processing request to be performed by the file server B, and the order of executing the processing requests, as illustrated in FIG. 20.

At S504, the scenario file generator 46 generates a scenario file transmit request message, addressed to the file server B that is the entity that performs the processing request "process1", and the operation ends. In this example, the contact ID of the file server B is used as an address of the message.

Referring back to FIG. 19, after the smart phone 40 generates the scenario file at S8.3, at S9, the smart phone 40 sends the scenario file transmit request message, addressed to the file server B, to the message queue server 50. The message queue server 50 stores the message, i.e., the scenario file transmit request, in the message queue 52.

Assuming that the file server B periodically sends a message obtaining request to the message queue server 50, at S10, the file server B obtains the scenario file transmit request addressed to the file server B, from the message queue server 50. At S11, the file server B executes a scenario, based on description of the scenario file.

Figure 23:
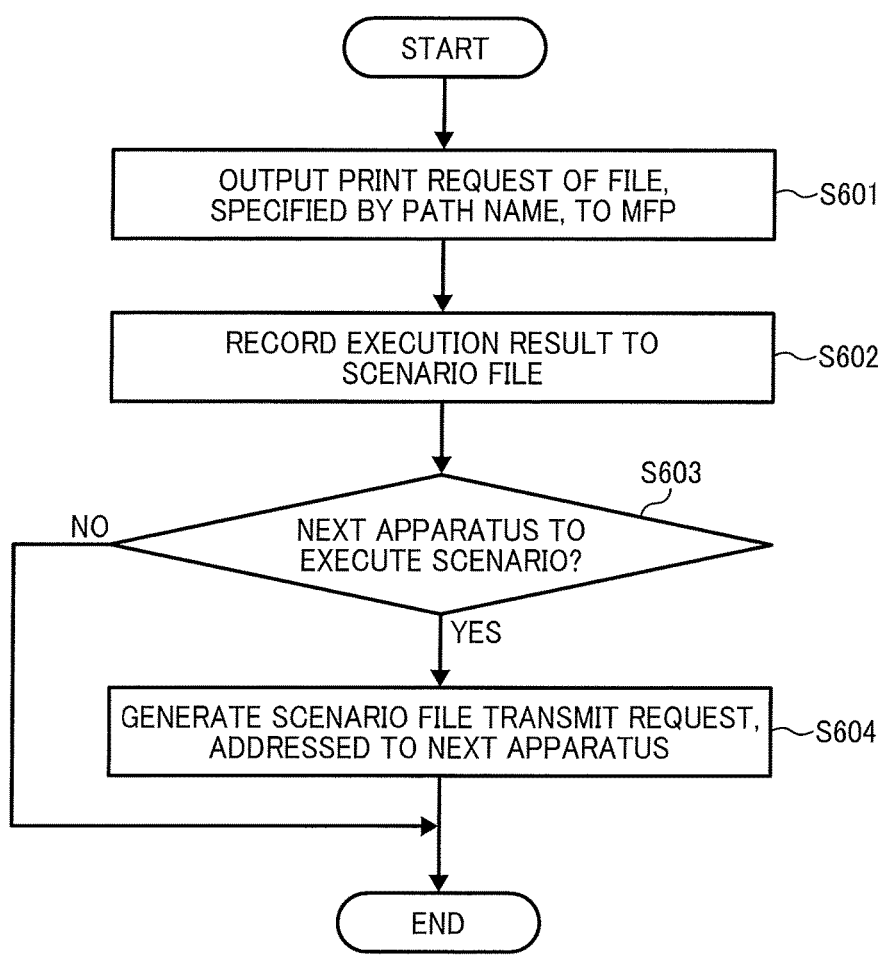
FIG. 23 is a flowchart illustrating operation of updating the scenario file, performed by the file server of the information processing system of FIG. 2, according to an example embodiment of the present invention.

FIGS. 22A and 22B (FIG. 22) illustrate an example data structure of the scenario file, which is updated after the file server B executes the scenario based on the scenario file at S11. Referring now to FIGS. 22 and 23, operation of updating the scenario file, performed by the file server B, is explained according to an example embodiment of the present invention.

More specifically, the scenario file analyzer 23 of the file server B analyzes the scenario described in the obtained scenario file to detect the processing request to be executed by the file server B. In this example, the scenario file analyzer 23 detects the processing request "process1" as the processing request to be executed at the file server B. Based on this analysis result, the processing request obtainer 24 obtains the processing request "process1". The processing request executor 25 executes the obtained processing request "process1". The scenario file update 26 updates the scenario file so as to reflect the execution result of the processing request "process1".

More specifically, at S601 of FIG. 23, the scenario file update 26 reads out binary data of the electronic data file "document2.doc" identified by the path name of the scenario file, and outputs the instruction for printing the electronic data file "document2.doc" to the MFP 30. For example, as indicated by S601 of FIG. 22, the "status" of the processing request "process1" is changed to "executed".

At S602, the scenario file update 26 records the execution result of the scenario, to the scenario file. For example, as indicated by S602 of FIG. 22, the execution result "result" of the processing request "process1" performed by the file server B indicates that it is successful.

At S603, the scenario file analyzer 23 determines whether there is any apparatus that executes the subsequent processing request of the scenario, for example, by searching for a processing request having the "unexecuted" status. In this example, it is assumed that there is no apparatus that executes the scenario ("NO" at S603), and the operation ends.

Referring back to FIG. 19, as the file server B executes the scenario at S14, the instruction for printing the file "document2.doc" is output to the MFP 30. At S15, the MFP converts the electronic data file "document2.doc" to print data, and outputs a printed image of the file "document2.doc".

In response to completion of printing by the MFP 30, at S16, the file server B sends a result transmit request message to the message queue server 50. The result transmit request message is addressed to the smart phone 40. At S19, the message queue server 50 sends the processing result indicating that printing is completed to the smart phone 40.

At S20, the smart phone 40 displays the processing result indicating that printing is completed, on the display, as illustrated in FIG. 9B.

As described above, in response to the user instruction input to the portable device 40 the MFP 30 in the office B is able to output a printed image of the electronic data file "document2" stored in the file server B in the office B. More specifically, the message queue server 50, which receives the user instruction from the portable device 40, operates in cooperation with the file server such as the file server B to execute one or more processing requests as defined by the user instruction.

Numerous additional modifications and variations are possible in light of the above teachings. It is therefore to be understood that within the scope of the appended claims, the disclosure of the present invention may be practiced otherwise than as specifically described herein. With some embodiments of the present invention having thus been described, it will be obvious that the same may be varied in many ways. For example, elements and/or features of different illustrative embodiments may be combined with each other and/or substituted for each other within the scope of this disclosure and appended claims.

In the above-described examples, the file server such as the file server A and the file server B is implemented as an example of information processing apparatus that operates in cooperation with the message queue server 50 through a network to perform controlling output processing. In alternative to the file server, any desired information processing apparatus capable of executing a processing request, such as a processing request described in a scenario file, may be used.

In the above-described examples, the portable device 40 is implemented as a smart phone. Alternatively, the portable device 40 may be implemented as a PDA, a notebook PC, a tablet PC, etc.

In the above-described examples, the dedicated application installed onto the portable device 40 may be implemented by the scenario file generator 50. The scenario file generator 50 uses the reading result of the QR code reader 49, which is the read result of the QR code being displayed on the electronic apparatus such as the MFP 30. More specifically, in the above-described examples, the device information obtainer 50 obtains the device information from the QR code read by the QR code reader 49. Alternatively, the scenario file generator 50 may use the device information, which is obtained in various other ways. In one example, the QR code reader 49 may obtain the device information from any desired two-dimensional code other than the QR code. Further, in alternative to causing the MFP 30 to display the QR code on the operation panel screen, the QR code may be displayed on a label sealed onto the MFP 30. In such case, the portable device 40 reads the QR code on the label. In another example, the QR code reader 49 and the device information obtainer 48 may be implemented by a communication device capable of reading out the device information from the MFP 30 by near field communication such as infrared communication.

In the above-described examples, the image forming apparatus such as the MFP 30 is used as one example of electronic apparatus functioning as an output apparatus that outputs the image of the electronic data file. Alternatively, the electronic apparatus may be implemented by an image projection apparatus such as a projector capable of projecting an image of the electronic data file.

The illustrated information processing system 100 is only illustrative of one of several computing environments for implementing the embodiments disclosed herein. For example, in some embodiments, the message queue server 50 includes a plurality of computing devices, e.g., a server cluster, that are configured to communicate with each other over any type of communications link, including a network, a shared memory, etc. to collectively perform the processes disclosed herein. Similarly, the file server can include a plurality of computing devices that are configured to communicate with each other.

Further, the functions or modules described above referring to FIG. 3 may be implemented in different ways, such that some functions may be performed by a different entity.

For example, the scenario file update 26 and the message generator 27 may be provided at the message queue server 50, in alternative to providing these modules at the file server. In such case, the message queue server 50 updates the scenario file based on the execution result received from the file server, and generates a message including the updated scenario file addressing the next apparatus to perform the subsequent processing request. The message queue server 50 further sends the scenario file to the next apparatus to cause the next apparatus to perform the subsequent processing request. In one example, the message queue server 50 may send a plurality of messages each including a specific processing request to be performed, respectively, to a plurality of apparatuses on local networks, if the processing requests can be concurrently performed.

In another example, the QR code generator 34 may be provided at the message queue server 50, in alternative to providing this module at the MFP 30. In such case, the message queue server 50 generates the QR code based on the device information of the MFP 30 and the device information of the file server B that reside on the local network of the MFP 30, and sends the QR code to the MFP 30 for display on the MFP 30.

In another example, some functions of the QR code generator 34 may be shared between the MFP 30 and the message queue server 50. For example, the message queue server 50 may send the device information of the file server B to the MFP 30. The MFP 30 generates a QR code, using the device information of the MFP 30 and the device information of the file server B.

In another example, the scenario file generator 46 of the portable device 40 may be provided at the message queue server 50. In such case, the message queue server 50 receives various information such as output apparatus information that identifies the electronic apparatus, information regarding the file server, and information regarding the processes to be executed, from the portable device 40. Based on these various types of information, the scenario file generator 46 generates a scenario file in a substantially similar manner as described above. For example, the portable device 40, which captures the QR code using the QR code reader 49 and analyzes the QR code using the device information obtainer 48, may generate a message including the analysis result of the QR code using the message generator 44.

Further, the scenario file may be described in various other ways. For example, the scenario file describes the file path and the network address of the file server separately, in different data fields. Alternatively, the network address may be included in the file path, as a part of the file path. For example, the file path may be described as "192.168.0.2/user01/document1.doc".

As described above, the user only needs to instruct the portable device 40 to process a request for outputting electronic data. The portable device 40, which operates in cooperation with the message queue server 50, generates and sends a scenario file describing a plurality of processing requests to be performed to a file server that performs the first processing request. The file server, which operates in cooperation with the message queue server 50, performs the first processing request and further causes the other file server to perform the subsequent processing request to process the request for outputting electronic data. With the message queue server 50, even when the file server is implemented by more than one file server on different networks, the processing requests including transferring of the electronic file and outputting of the electronic file can be performed seamlessly.

More specifically, in response to a user instruction input to the portable device such as the smart phone, the message queue server 50 that resides on the external network operates in cooperation with the file server that resides on the local network to instruct the electronic apparatus to perform processing according to the user instruction. Accordingly, the message queue server 50 and the file server together functions as an information processing system that controls processing of electronic data.

In order to further improve user operability, the portable device may be additionally provided with the dedicated application that causes the portable device to automatically generate a scenario file, using information obtained using a code reader or a near field communication device.

Further, any of the above-described devices or units can be implemented as a hardware apparatus, such as a special-purpose circuit or device, or as a hardware/software combination, such as a processor executing a software program.

Figure 24:
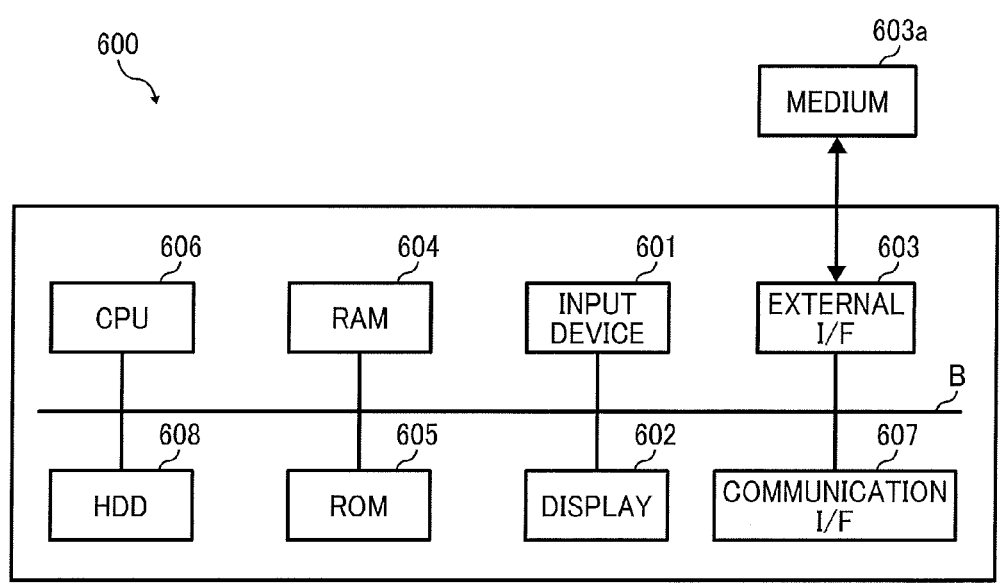
FIG. 24 is a schematic block diagram illustrating a hardware structure of any one of the file server and a message queue server of the information processing system of FIG. 2.

For example, any one of the message queue server 50, the file server A, and the file server B may be implemented by a computer system including one or more computer devices each having a hardware structure illustrated in FIG. 24.

Referring to FIG. 24, the hardware structure 600 of the computer system includes an input device 601, a display 602, an external interface (I/F) 603, a random access memory (RAM) 604, a read only memory (ROM) 605, a central processing unit (CPU) 606, a communication interface (I/F) 607, and a hard disk drive (HDD) 608, which are connected through a bus B.

The input device 601 may be implemented by any device functioning as a user interface that interacts with a user such as a keyboard, a mouse, or a touch-panel screen. The input device 601 receives a user instruction, and sends an operation signal based on the user instruction to the CPU 606.

The display 602 may be implemented by a liquid crystal display (LCD), and displays various information to the user such as a processing result of the computer system 600.

The communication I/F 607, which may be implemented by a network interface circuit, connects the computer system 600 with the outside apparatus through the network such as the local network A or B or the external network 102.

The HDD 608 is a nonvolatile memory, which may store various control programs or data for use by the CPU 606. For example, the HDD 608 may store the operating system (OS) that controls entire operation of the computer system 600, and various application programs that may run on the OS. The HDD 608 may manage various programs or data using a predetermined file system or a database.

The external I/F 603, which may be implemented by an interface circuit, communicates with the outside device such as a recording medium 603a. The recording medium 603a, which may be freely attached to or detached from the computer system 600 through the external I/F 603, may previously store various data such as application programs. Through the external I/F 603, the CPU 606 of the computer system 600 reads or writes data with respect to the recording medium 603a. Examples of the recording medium 603a include, but not limited to, flexible disk, CD, digital versatile disk (DVD), SD memory card, and Universal Serial Bus (USB) memory.

The ROM 605 is a nonvolatile memory, which stores various programs or data in a manner such that it is not deleted even when the power of the computer system 600 is turned off. The ROM 605 stores the Basic Input/Output System (BIOS) to be executed at the time of starting up the system, and various settings data such as the OS settings data or the network settings data. The RAM 604 is a volatile memory, which temporarily stores various programs or data.

The CPU 606 reads the programs or data from the nonvolatile memory such as the ROM 605 or the HDD 608 onto the volatile memory such as the RAM 604 to perform operation according to the read programs or data.

In one example, the CPU 606 of the computer system 600 loads a message queue server control program from the nonvolatile memory onto the volatile memory to cause the computer system 600 to function as the message queue server 50 of FIG. 2. In another example, the CPU 606 of the computer system 600 loads a file server control program from the nonvolatile memory onto the volatile memory to cause the computer system 600 to function as the file server A or B of FIG. 2.

The portable device 40 has a hardware structure that is substantially similar to that of the general-purpose portable device such as the general-purpose smart phone. More specifically, the portable device 40 may be caused to additionally have various functional modules such as the message relay agent 42, the message generator 44, and the device information obtainer 48.

Further, as described above, any one of the above-described and other methods of the present invention may be embodied in the form of a computer program stored in any kind of storage medium. For example, any one of the above-described functions of the information processing system 100 may be implemented by an executable computer program, which may be written in any desired computer programming language such as the object-oriented programming language including C, C++, C#, and Java. Examples of storage mediums include, but are not limited to, flexible disk, hard disk, optical discs such as CD-ROM and DVD, magneto-optical discs, EEPROM, EPROM, magnetic tapes, nonvolatile memory cards, ROM (read-only-memory), etc. The computer programs may be distributed, for example, in the form of storage medium or over a network. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in an information processing system that controls output of electronic data from an output apparatus. The relay apparatus includes: receiving means for receiving 1) data identification information that identifies the electronic data to be output from the output apparatus and 2) output apparatus identification information that identifies the output apparatus, from an operation device communicable with the relay apparatus; identification data transmitting means for sending the data identification information to a first information processing apparatus that stores the electronic data in response to a first request transmitted from the first information processing apparatus; and data transmitting means for sending 1) the electronic data to be output, the electronic data being obtained by the first information processing apparatus using the data identification information and 2) the output apparatus identification information received from the operation device to a second information processing apparatus in response to a second request transmitted from the second information processing apparatus. The first information processing apparatus includes: first request transmitting means for sending the first request to the relay apparatus; storing means for storing the electronic data; data transmitting means for sending the electronic data to be output that is obtained using the data identification information transmitted from the relay apparatus in response to the first request, to the relay apparatus. The second information processing apparatus includes: second request transmitting means for sending the second request to the relay apparatus; and first controlling means for controlling the output apparatus identified by the output apparatus identification information to output the electronic data being obtained by the first information processing apparatus, in response to the electronic data and the output apparatus identification information that are respectively received from the relay apparatus in response to the second request sent from the second information processing apparatus.

In one example, the information processing apparatus may be implemented by the file server system 100, which includes the first information processing apparatus such as the file server A or B, the second information processing apparatus such as the file server A or B, and the relay apparatus such as the message queue server 50. The file server system 100 includes the message queue server 50, which operates in cooperation with the file server A or B to control output of electronic data "document1.doc" stored in the file server A from the output apparatus such as the MFP 30 that resides on the network on which the file server B is provided. For example, the first file server may be implemented by one or more information processing apparatuses provided on the first network, and the second file server may be implemented by one or more information processing apparatuses provided on the second network.

The receiving means of the relay apparatus corresponds to the message receiver 54, which may be implemented by the CPU 606 and the communication I/F 607. The message receiver 54 may receive the data identification information such as the path name of the electronic data "document1.doc", and the output apparatus identification information such as the MFP device information. The identification data transmitting means of the relay apparatus corresponds to the message transfer device 56, which may be implemented by the CPU 606 and the communication I/F 607. The message transfer device 56 sends the data identification information such as a scenario file including the path name of the electronic data to be output, to the file server A in response to the message obtaining request transmitted from the file server A.

The first request transmitting means of the first information processing apparatus corresponds to the message relay agent 22, which may be implemented by the CPU 606 and the communication I/F 607. The message relay agent 22 sends the message obtaining request to the message queue server 50. The data transmitting means of the first information processing apparatus corresponds to the scenario file analyzer 23, the processing request obtainer 24, and the processing request executor 25, and the message relay agent 22. The scenario file analyzer 23, the processing request obtainer 24, and the processing request executor 25 are implemented by the CPU 606. The message relay agent 22 transmits the electronic data identified by the data identification information (path name) transmitted from the message queue server 50 in response to the first request, which is obtained from a memory of the file server A.

The second request transmitting means of the second information processing apparatus corresponds to the message relay agent 22 of the file server B, which may be implemented by the CPU 606 and the communication I/F 607. The message relay agent 22 sends the second request, such as the message obtaining request, to the message queue server 50. The first controlling means of the second information processing apparatus corresponds to the scenario file analyzer 23, the processing request obtainer 24, and the processing request executor 25, each of which may be implemented by the CPU 606. In response to receiving the electronic data and the output apparatus identification information, for example, the scenario file including the binary data of the electronic data and the MFP device information, which is transmitted from the message queue server 50 in response to the message obtaining request from the second information processing apparatus, the first controlling means controls the output apparatus such as the MFP 30, identified by the MFP device information, to output the electronic data.

In the above-described information processing system, the receiving means of the relay apparatus may further receive information processing apparatus identification information that identifies the first information processing apparatus, from the operation device.

In the above-described information processing system, the information processing apparatus identification information is described as a part of the data identification information. For example, the network address that is one example of the information processing apparatus identification information may be included in the file path that is one example of the data identification information.

In the above-described information processing system, the identification data transmitting means of the relay apparatus sends the output apparatus identification information in addition to the data identification information to the first information processing apparatus in response to the first request transmitted from the first information processing apparatus. The data transmitting means of the first information processing apparatus sends a request to the relay apparatus, which requests the relay apparatus to send 1) the electronic data stored in the storing means and 2) the output apparatus identification information, to the second information processing apparatus.

In the above-described information processing system, the first information processing apparatus further includes second controlling means for transferring the electronic data stored in the storing means directly to the output apparatus without sending the electronic data to the relay apparatus, when the output apparatus identified by the output apparatus identification information is an output apparatus that resides on a local network on which the first information processing apparatus resides.

In the above-described information processing system, the first controlling means of the first information processing apparatus sends an output execution result to the operation device via the relay apparatus.

In one example, the present invention may reside in an information processing method of controlling output of electronic data from an output apparatus, performed by an information processing system including a relay apparatus, a first information processing apparatus, and a second information processing apparatus. The relay apparatus performs the steps of: receiving 1) data identification information that identifies the electronic data to be output from the output apparatus and 2) output apparatus identification information that identifies the output apparatus, from an operation device communicable with the relay apparatus; sending the data identification information to the first information processing apparatus that stores the electronic data in response to a first request transmitted from the first information processing apparatus; and sending 1) electronic data that is sent from the first information processing apparatus that receives the data identification information and 2) the output apparatus identification information received from the operation device to a second information processing apparatus in response to a second request transmitted from the second information processing apparatus. The first information processing apparatus performs the steps of: sending the first request to the relay apparatus; and sending the electronic data identified by the data identification information transmitted from the relay apparatus in response to the first request, to the relay apparatus. The second information processing apparatus performs the steps of: sending the second request to the relay apparatus; and controlling the output apparatus identified by the output apparatus identification information to output the electronic data, in response to the electronic data and the output apparatus identification information that are respectively received from the relay apparatus in response to the second request.

In one example, the present invention may reside in a non-transitory recording medium storing a plurality of instructions which, when executed by a processor, cause the information processing apparatus and the relay apparatus to operate in cooperation to perform the method of controlling output of electronic data from an output apparatus.

For example, the plurality of instructions may classified into first program to be installed onto the first information processing apparatus, second program to be installed onto the second information processing apparatus, and third program to be installed onto the third information processing apparatus. The third program causes the relay apparatus to perform the steps of: receiving 1) data identification information that identifies the electronic data to be output from the output apparatus and 2) output apparatus identification information that identifies the output apparatus, from an operation device communicable with the relay apparatus; sending the data identification information to the first information processing apparatus that stores the electronic data in response to a first request transmitted from the first information processing apparatus; and sending 1) electronic data that is sent from the first information processing apparatus that receives the data identification information and 2) the output apparatus identification information received from the operation device to a second information processing apparatus in response to a second request transmitted from the second information processing apparatus. The first program causes the first information processing apparatus to perform the steps of: sending the first request to the relay apparatus; and sending the electronic data identified by the data identification information transmitted from the relay apparatus in response to the first request, to the relay apparatus. The second program causes the second information processing apparatus to perform the steps of: sending the second request to the relay apparatus; and controlling the output apparatus identified by the output apparatus identification information to output the electronic data, in response to the electronic data and the output apparatus identification information that are respectively received from the relay apparatus in response to the second request.

The third program for the relay apparatus may be previously installed onto the relay apparatus. In such case, the present invention may reside in the relay apparatus, and the first program and the second program that are respectively installed onto the first information processing apparatus and the second information processing apparatus.

The first program for the first information processing apparatus and the second program for the second information processing apparatus may be previously installed onto the first information processing apparatus and the second information processing apparatus. In such case, the present invention may reside in the third program, the first information processing apparatus, and the second information processing apparatus.

In one example, the present invention may reside in a relay apparatus, which operates in cooperation with a first information processing apparatus and a second information processing apparatus. The relay apparatus includes: receiving means for receiving 1) data identification information that identifies the electronic data to be output from the output apparatus and 2) output apparatus identification information that identifies the output apparatus, from an operation device communicable with the relay apparatus; identification data transmitting means for sending the data identification information to a first information processing apparatus that stores the electronic data in response to a first request transmitted from the first information processing apparatus; and data transmitting means for sending 1) electronic data that is sent from the first information processing apparatus that receives the data identification information and 2) the output apparatus identification information received from the operation device to a second information processing apparatus in response to a second request transmitted from the second information processing apparatus.

In one example, the present invention may reside in a method of controlling output of electronic data from an output apparatus, performed by a relay apparatus that operates in cooperation with a first information processing apparatus and a second information processing apparatus. The method includes: receiving 1) data identification information that identifies the electronic data to be output from the output apparatus and 2) output apparatus identification information that identifies the output apparatus, from an operation device communicable with the relay apparatus; sending the data identification information to a first information processing apparatus that stores the electronic data in response to a first request transmitted from the first information processing apparatus; and sending 1) electronic data that is sent from the first information processing apparatus that receives the data identification information and 2) the output apparatus identification information received from the operation device to a second information processing apparatus in response to a second request transmitted from the second information processing apparatus.

What is claimed is:

1. An information processing system comprising a first information processing apparatus at a first location and a second information processing apparatus at a second location,
   wherein the first information processing apparatus is a file server that includes processing circuitry configured to:
      for a relay device that is connected to the first information processing apparatus and the second information processing apparatus, transmit a first request to the relay device,
      execute processing at the first information processing apparatus according to a processing request that is transmitted from the relay device in response to the first request, the processing request including a scenario generated by a source device of the processing request that specifically identifies processing to be performed by the first information processing apparatus and the second information processing apparatus in order to complete the processing request, and
      transmit, when the processing request further includes processing to be executed at the second information processing apparatus, a result of executing the processing at the first information processing apparatus and a request for executing the processing to be performed at the second information processing apparatus, to the relay device; and
   wherein the second information processing apparatus is a file server that includes processing circuitry configured to:
      transmit a second request to the relay device,
      receive, from the relay device in response to the second request, the result of executing the processing executed at the first information processing apparatus and the request for executing the processing to be performed at the second information processing apparatus, and
      execute the processing at the second information processing apparatus in response to the received request for executing the processing to be performed at the second information processing apparatus, using the result of executing the processing at the first information processing apparatus.

2. The information processing system of claim 1, wherein the second information processing apparatus transmits a result of executing the processing at the second information processing apparatus to the source device of the processing request that is transmitted from the relay device via the relay device.

3. The information processing system of claim 1, wherein the processing to be performed at one of the first information processing apparatus and the second information processing apparatus is an instruction for outputting through an output device.

4. The information processing system of claim 3, wherein the source device of the processing request is a mobile terminal, and the mobile terminal and the output device are located at the second location.

5. The information processing system of claim 1,
wherein the first information processing apparatus
obtains, based on information identifying electronic data included in the processing request transmitted from the relay device, the electronic data stored at the first information processing apparatus, and
when the processing request includes the processing to be performed at the second information processing apparatus, transmits the obtained electronic data and the request for executing the processing to be executed at the second information processing apparatus to the relay device, and
wherein the second information processing apparatus executes processing using the obtained electronic data in response to the received processing request.

6. The information processing system of claim 1, wherein the relay device is located beyond respective firewalls located at each of the first location and second location.

7. An information processing system comprising:
a first information processing apparatus at a first location;
a second information processing apparatus at a second location;
a relay device; and
a mobile terminal,
wherein for the relay device that is connected to the information processing system, the mobile terminal includes processing circuitry configured to transmit a processing request to the relay device, the processing request including a scenario generated by the mobile terminal that specifically identifies processing to be performed by the first information processing apparatus and the second information processing apparatus in order to complete the processing request,
wherein the relay device includes processing circuitry configured to:
receive a data list obtaining request from the mobile terminal;
obtain from the first information processing apparatus, a file list indicating one or a plurality of files stored in the first information processing apparatus, in response to the data list obtaining request; and
transmit the file list to the mobile terminal;
wherein the mobile terminal includes processing circuitry configured to:
obtain the file list from the relay device;
display, on a monitor, the file list; and
receive selection of a file from the one or the plurality of files indicated by the file list;
wherein the first information processing apparatus includes processing circuitry configured to:
execute first processing at the first information processing apparatus according to a processing request that is transmitted from the relay device the first processing is reading the file selected from the one or the plurality of files indicated by the file list; and
transmit a result of executing the first processing at the first information processing apparatus to the relay device; and
wherein the second information processing apparatus includes processing circuitry configured to:
receive, from the relay device the result of executing the first processing executed at the first information processing apparatus and a request for executing second processing to be performed at the second information processing apparatus, and
execute the second processing at the second information processing apparatus in response to the received request for executing the processing to be performed at the second information processing apparatus, using the result of executing the first processing at the first information processing apparatus.

8. The information processing apparatus of claim 7, wherein the mobile terminal
obtains at least one of: first identification information identifying the first information processing apparatus and second identification information identifying the second information processing apparatus, and
transmits a processing request addressed to the obtained identification information to the relay device.

9. The information processing system of claim 7, wherein the mobile terminal obtains third identification information identifying an electronic device connected to one of the first information processing apparatus and the second information processing apparatus, and
transmits, to the relay device, a processing request for requesting the connected one of the first information processing apparatus and the second information processing apparatus, to execute processing using the electronic device identified with the obtained third identification information.

10. An information processing system comprising a first information processing apparatus at a first location and a mobile terminal,
wherein for a relay device that is connected to the first information processing apparatus, the mobile terminal includes processing circuitry configured to transmit a processing request to the relay device connected to the first information processing apparatus, and
wherein the first information processing apparatus is a file server that includes processing circuitry configured to:
transmit a first request to the relay device;
execute processing at the first information processing apparatus according to the processing request that is received from the mobile terminal and transmitted from the relay device in response to the first request; and
transmit, when the processing request further includes processing to be executed at a second information processing apparatus, a result of executing the processing at the first information processing apparatus and a request for executing the processing to be performed at the second information processing apparatus which is a file server at a second location, to the relay device, the processing request including a scenario generated by the mobile terminal that specifically identifies processing to be performed by the first information processing apparatus and the second information processing apparatus in order to complete the processing request.

11. The information processing system of claim 10, wherein, when the processing request does not include the processing to be executed at the second information processing apparatus, the first information processing apparatus transmits the result of executing the processing at the first information processing apparatus to the mobile terminal via the relay device.

* * * * *

UNITED STATES PATENT AND TRADEMARK OFFICE
CERTIFICATE OF CORRECTION

| | | |
|---|---|---|
| PATENT NO. | : 10,430,135 B2 | Page 1 of 1 |
| APPLICATION NO. | : 15/229878 | |
| DATED | : October 1, 2019 | |
| INVENTOR(S) | : Ryo Shimomoto | |

It is certified that error appears in the above-identified patent and that said Letters Patent is hereby corrected as shown below:

On the Title Page

Item (54) and in the Specification, Column 1, Lines 1-5, should read:
-- RELAY APPARATUS, INFORMATION PROCESSING APPARATUS, INFORMATION PROCESSING SYSTEM, AND RECORDING MEDIUM STORING INFORMATION PROCESSING PROGRAM --

Signed and Sealed this
Twenty-first Day of April, 2020

Andrei Iancu
*Director of the United States Patent and Trademark Office*